US009487007B2

(12) United States Patent
Sugiura et al.

(10) Patent No.: US 9,487,007 B2
(45) Date of Patent: Nov. 8, 2016

(54) LIQUID DISCHARGE APPARATUS AND METHOD FOR PRODUCING HEAT SINK

(71) Applicant: Brother Kogyo Kabushiki Kaisha, Nagoya-shi, Aichi-ken (JP)

(72) Inventors: Keita Sugiura, Toyoake (JP); Yasuo Kato, Chita-gun (JP); Takashi Aiba, Nagoya (JP); Taisuke Mizuno, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/757,439

(22) Filed: Dec. 23, 2015

(65) Prior Publication Data

US 2016/0221337 A1 Aug. 4, 2016

(30) Foreign Application Priority Data

Jan. 30, 2015 (JP) .................................. 2015-016378

(51) Int. Cl.
*B41J 2/14* (2006.01)
*B23P 15/26* (2006.01)

(52) U.S. Cl.
CPC .............. *B41J 2/1433* (2013.01); *B23P 15/26* (2013.01); *B41J 2/1408* (2013.01); *B41J 2/14072* (2013.01); *B41J 2/14201* (2013.01); *B41J 2002/14491* (2013.01)

(58) Field of Classification Search
CPC B41J 2/1433; B41J 2/14024; B41J 2/14072; B41J 2/1408; B41J 2/14201; B41J 2/14314; B41J 2/14427; B41J 2/17526; B41J 2002/08; B41J 2/14266; B41J 2/14491; B41J 2/20; B23P 15/16
See application file for complete search history.

(56) References Cited

U.S. PATENT DOCUMENTS

| | | | | |
|---|---|---|---|---|
| 7,252,358 B2* | 8/2007 | Katayama | .............. | B41J 2/1408 347/18 |
| 7,438,377 B2* | 10/2008 | Kubo | ................... | B41J 2/14072 347/18 |
| 7,674,984 B2* | 3/2010 | Kubo | ................... | B41J 2/14072 174/254 |
| 7,695,119 B2 | 4/2010 | Ito | | |
| 7,992,961 B2* | 8/2011 | Chikamoto | .......... | B41J 2/14209 347/29 |
| 8,413,377 B2 | 4/2013 | Koyama | | |
| 9,144,980 B2 | 9/2015 | Watanabe et al. | | |
| 2007/0109364 A1 | 5/2007 | Ito | | |
| 2011/0316942 A1 | 12/2011 | Koyama | | |

(Continued)

FOREIGN PATENT DOCUMENTS

| | | |
|---|---|---|
| EP | 2889141 A1 | 7/2015 |
| JP | 2007-130968 A | 5/2007 |

(Continued)

*Primary Examiner* — Anh T. N. Vo
(74) *Attorney, Agent, or Firm* — Banner & Witcoff, Ltd.

(57) ABSTRACT

There is provided a liquid discharge apparatus including: driving elements; a first member including a first trace and a first IC connected to ones of the plurality of driving elements; a second member including a second trace and a second IC connected to other ones of the driving elements; and a metallic member arranged on one side with respect to the plurality of driving elements in a second direction orthogonal to the liquid discharge surface, the metallic member including: a body portion extending in the first direction while straddling over the driving elements, a first projection projected from the body portion toward the liquid discharge surface; and a second projection projected from the body portion toward the liquid discharge surface, wherein the first IC is supported by the first projection and the second IC is supported by the second projection.

17 Claims, 15 Drawing Sheets

(56) References Cited

U.S. PATENT DOCUMENTS

2015/0202875 A1 7/2015 Watanabe et al.
2015/0352848 A1 12/2015 Watanabe et al.

FOREIGN PATENT DOCUMENTS

| JP | 2012-011561 A | 1/2012 |
| JP | 2014-054835 A | 3/2014 |

* cited by examiner

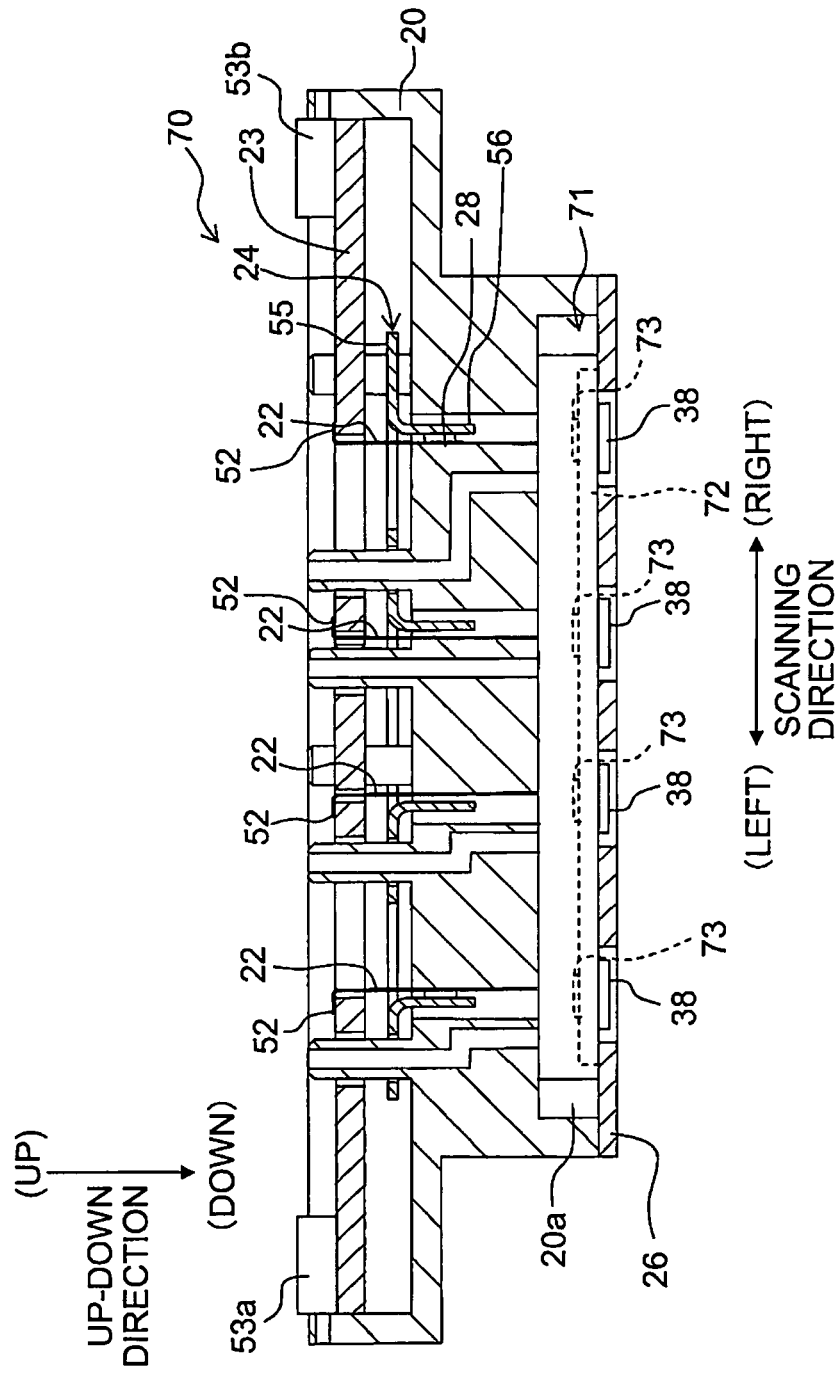

LIQUID DISCHARGE APPARATUS AND METHOD FOR PRODUCING HEAT SINK

CROSS REFERENCE TO RELATED APPLICATION

The present application claims priority from Japanese Patent Application No. 2015-016378 filed on Jan. 30, 2015, the disclosure of which is incorporated herein by reference in its entirety.

BACKGROUND

Field of the Invention:

The present teaching relates to a liquid discharge apparatus which discharges a liquid, and a method for producing a heat sink.

Description of the Related Art

Conventionally, there is known a printer provided with an ink-jet head which discharges an ink from a plurality of nozzles, as a liquid discharge apparatus. As an example of such a printer, there is known a printer provided with the ink-jet head, and a carriage to which the ink-jet head is attached and which is moved in a direction of the width of a recording medium (scanning direction).

In the conventionally known printer, the ink-jet head is provided with four head units which are arranged side by side with one another in the scanning direction of the carriage, and each of the head units has a nozzle plate formed with the plurality of nozzles, a flow channel substrate in which a plurality of pressure chambers, etc. are formed, and a plurality of piezoelectric elements which are arranged on the flow channel substrate corresponding to the plurality of pressure chambers, respectively. Further, flexible flat cables are connected to the head units, respectively, and each of the flexible flat cables is extended upward from one of the head units. Furthermore, an IC driving piezoelectric elements among the plurality of driving elements is provided on each of the flexible flat cables, at an intermediate portion thereof, in the up-down direction.

The IC provided on each of the flexible flat cables is configured to drive the piezoelectric elements. When the IC is driving the piezoelectric elements, heat is generated in the IC. Further, a portion of the heat generated in the IC is transferred to the head unit via a member (a wiring member or a trace member), thereby changing the temperature of the ink. In a case that the temperature of the ink is changed, the physical property of the ink, such as the viscosity of the ink, etc., is consequently changed, which in turn also changes the discharge characteristic of the nozzle (such as a discharging amount, discharging speed, etc.).

In the conventionally known printer, the flexible flat cables are connected to the head units, respectively. Further, since the heat generating amount in each of the ICs depends on a usage situation (for example, frequency of performing discharge) of one of the head units corresponding thereto, the heat generating amount is different (varied) among the plurality of ICs. Accordingly, due to the variation in the heat generating amount among the ICs, the temperature of the ink tends to easily differ among the plurality of head units. This is one of major factors causing the variation in the discharge characteristic among the plurality of nozzles.

An object of the present disclosure is to suppress any variation in the discharge characteristic among the nozzles due to any variation in the heat generating amount among the plurality of ICs.

SUMMARY

According to a first aspect of the present teaching, there is provided a liquid discharge apparatus configured to discharge a liquid from a plurality of nozzles formed in a liquid discharge surface, including:

a plurality of driving elements;

a first member which includes a first trace electrically connected to ones of the plurality of driving elements, and a first IC electrically connected to the first trace;

a second member which includes a second trace electrically connected to other ones of the plurality of driving elements, different from the portion of the plurality of driving elements, and a second IC electrically connected to the second trace, and which is arranged side by side with the first member in a first direction parallel to the liquid discharge surface; and a metallic member which is arranged on one side with respect to the plurality of driving elements in a second direction orthogonal to the liquid discharge surface, the metallic member including: a body portion extending in the first direction while straddling over the plurality of driving elements, a first projection projected from the body portion toward the liquid discharge surface, and a second projection projected from the body portion toward the liquid discharge surface, wherein the first IC is supported by the first projection and the second IC is supported by the second projection.

In the present teaching, the plurality of driving elements may be arranged side by side with one another in the direction parallel to the liquid discharge surface. The first member is connected to ones of the plurality of driving elements, and the second member is connected to the other portion of the plurality of driving elements. Further, each of the first and second members may be connected to the circuit board which is arranged to overlap with the plurality of driving elements in the second direction orthogonal to the liquid discharge surface. The first and second members have the first and second ICs, respectively, and the first and second ICs drive the plurality of driving elements based on a signal inputted from the circuit board. Here, since the first and second ICs are supported respectively by the first and second projections of the metallic member, the heat generated in the first and second ICs are transferred from the first and second projections to the body portion of the metallic member. Accordingly, since the heat generated in each of the first and second ICs is soaked by the body portion of the metallic member, any variations in the temperature between the first and second ICs and between the first and second member are suppressed. Thus, any variation in the temperature of a liquid to which the discharge energy is imparted is small between the driving elements driven by the first IC and the driving elements driven by the second IC, thereby making it possible to suppress any variation in the discharging characteristic among the different discharging ports.

Further, in the present teaching, the above-described metallic member may be arranged between a liquid discharge head and the circuit board in the second direction. Namely, the metallic member may be arranged on a side closer to the liquid discharge head than the circuit board. With this, the distance between the first and second ICs supported by the first and second projections of the metallic member and the driving elements becomes small, which in turn suppress the trace resistance between the first and second ICs and the driving elements to be low. Further, since the first and second projections, of the metallic member, which support the first and second ICs are projected in the second direction from the body portion extending in the first direction, there is no need to make the members extending in the second direction to route in the first direction for the purpose of supporting the first and second ICs by the first and second projections. Accordingly, it is possible to suppress the size of the apparatus in the plane parallel to the liquid discharge surface (plane including the first direction) to be small.

According to a second aspect of the present teaching, there is provided a liquid discharge apparatus configured to discharge a liquid from a plurality of nozzles formed in a liquid discharge surface, including:

a plurality of driving elements;

a first member which includes a first trace electrically connected to ones of the plurality of driving elements, and a first IC electrically connected to the first trace;

a second member which includes a second trace electrically connected to other ones of the plurality of driving elements, different from the portion of the plurality of driving elements, and a second IC electrically connected to the second trace, and which is arranged side by side with the first member in a first direction parallel to the liquid discharge surface; and a heat sink which is arranged on one side, with respect to the plurality of driving elements, in a second direction orthogonal to the liquid discharge surface, the heat sink including: a body portion extending in the first direction while straddling over the plurality of driving elements, a first projection projected from the body portion toward the liquid discharge surface, and a second projection projected from the body portion toward the liquid discharge surface, wherein the first IC is supported by the first projection and the second IC is supported by the second projection.

According to a third aspect of the present teaching, there is provided a method for producing a heat sink, including:

preparing a metallic sheet material;

forming a cut portion in the sheet material so that the cut portion surrounds a portion, of the sheet material, which is to become a first projection, but does not surround an end portion of the portion which is to become the first projection;

forming another cut portion in the sheet material so that the another cut portion surrounds another portion, of the sheet material, which is to become a second projection, but does not surround an end portion of the another portion which is to become the second projection;

bending the end portion, of the portion which is to become the first projection in the sheet material, to form the first projection; and bending the end portion, of the another portion which is to become the second projection in the sheet material, to form the second projection.

BRIEF DESCRIPTION OF THE DRAWINGS

FIGS. 9A and 9B each depict the heat sink, wherein FIG. 9A is a plane view of the heat sink, and FIG. 9B is a cross-sectional view taken along a line IXB-IXB in FIG. 9A.

FIGS. 15A and 15B depict a heat sink according to yet another modification, wherein FIG. 15A is a plane view of the heat sink, and FIG. 15B is a cross-sectional view taken along a line XVB-XVB of FIG. 15A.

FIG. 16 is a cross-sectional view of an ink discharge apparatus according to another modification.

DESCRIPTION OF THE EMBODIMENTS

Figure 1:
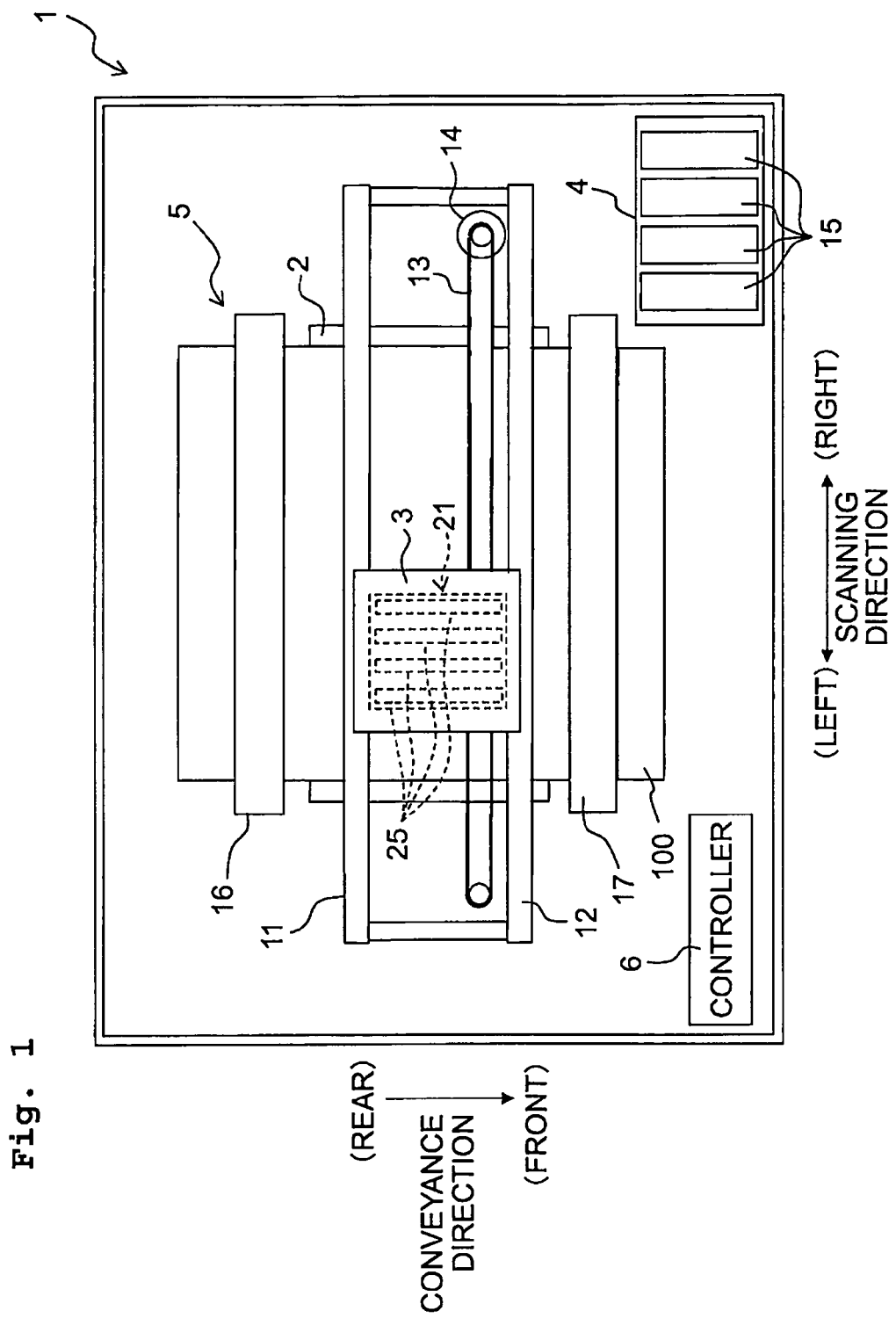
FIG. 1 is a schematic top view of a printer according to an embodiment of the present teaching.

Next, an embodiment of the present teaching will be described, with reference to the drawings as appropriate. At first, the overall configuration of an ink-jet printer 1 will be explained with reference to FIG. 1. Note that the respective directions of front, rear, left, right as depicted in FIG. 1 are defined as "front (frontward)", "rear (rearward)", "left (leftward)" and "right (rightward)" of the ink-jet printer 1. Further, the fore side (front side) of the sheet surface of FIG. 1 is defined as "up (upward), and the far side (the other side) of the sheet surface of FIG. 1 is defined as "down (downward)".

<Schematic Configuration of Printer>

As depicted in FIG. 1, the ink-jet printer 1 is provided with a platen 2, an ink discharge apparatus 3, a cartridge holder 4, a conveyance mechanism 5, a controller 6, etc.

On the upper surface of the platen 2, a recording paper (recording paper sheet) 100 as a recording medium is placed. The ink discharge apparatus 3 has an ink-jet head 21. The ink-jet head 21 is provided with four head units 25 which discharge ink toward the recording paper 100 placed on the platen 2. In a region facing the platen 2, the ink discharge apparatus 3 reciprocates in a left-right direction, along two guide rails 11 and 12. In the following explanation, the left-right direction is referred to also as the "scanning direction". An endless belt 13 is connected to the ink discharge apparatus 3; and the endless belt 13 is driven by a driving motor 14. Accompanying with the driving of the endless belt 13, the ink discharge apparatus 3 is moved in the scanning direction. Each of the head units 25 are formed with nozzles, and the ink discharge apparatus 3 causes the ink to be discharged from the nozzles toward the recording paper 100 placed on the platen 2, while the ink discharge apparatus 3 is moving in the scanning direction. The configuration of the ink discharge apparatus 3 will be described later on.

On the cartridge holder 4, ink cartridges 15 for four colors (black, yellow, cyan and magenta) are detachably installed. The cartridge holder 4 is connected, by non-illustrated tubes, to the ink discharge apparatus 3. The four color inks stored in the four ink cartridges 15, respectively, of the cartridge holder 4 are supplied to the ink discharge apparatus 3 via the tubes.

The conveyance mechanism 5 has two conveyance rollers 16, 17 arranged to sandwich the platen 2 therebetween in the front-rear direction. The two conveyance rollers 16 and 17 are driven while being synchronized to each other by a non-illustrated conveyance motor. The conveyance mechanism 5 conveys the recording paper 100 placed on the platen 2 in the forward direction (hereinafter referred to also as a "conveying direction") by the two conveyance rollers 16, 17.

The controller 6 includes a ROM (Read Only Memory), a RAM (Random Access Memory), an ASIC (Application Specific Integrated Circuit) including various control circuits, etc. The controller 6 performs various processes, such as printing onto the recording paper 100 by the ink discharge apparatus 3, etc., by the ASIC according to programs stored in the ROM.

For example, in the printing process, based on a print command input from an external device such as a PC (Personal Computer), the controller 6 controls the ink discharge apparatus 3, the driving motor 14, the conveyance motor (not depicted) of the conveyance mechanism 5, etc., so as to print an image, etc. on the recording paper 100. Specifically, the controller 6 alternately performs an ink discharging operation for causing the ink to be discharged or jetted from the nozzles of the four head units 25 of the ink-jet head 21 while moving the ink discharge apparatus 3 in the scanning direction, and a conveyance operation for causing the conveyance rollers 16 and 17 of the conveyance mechanism 5 to convey the recording paper 100 by a predetermined amount in the conveying direction.

<Detailed Configuration of Ink Discharge Apparatus>

Figure 2:
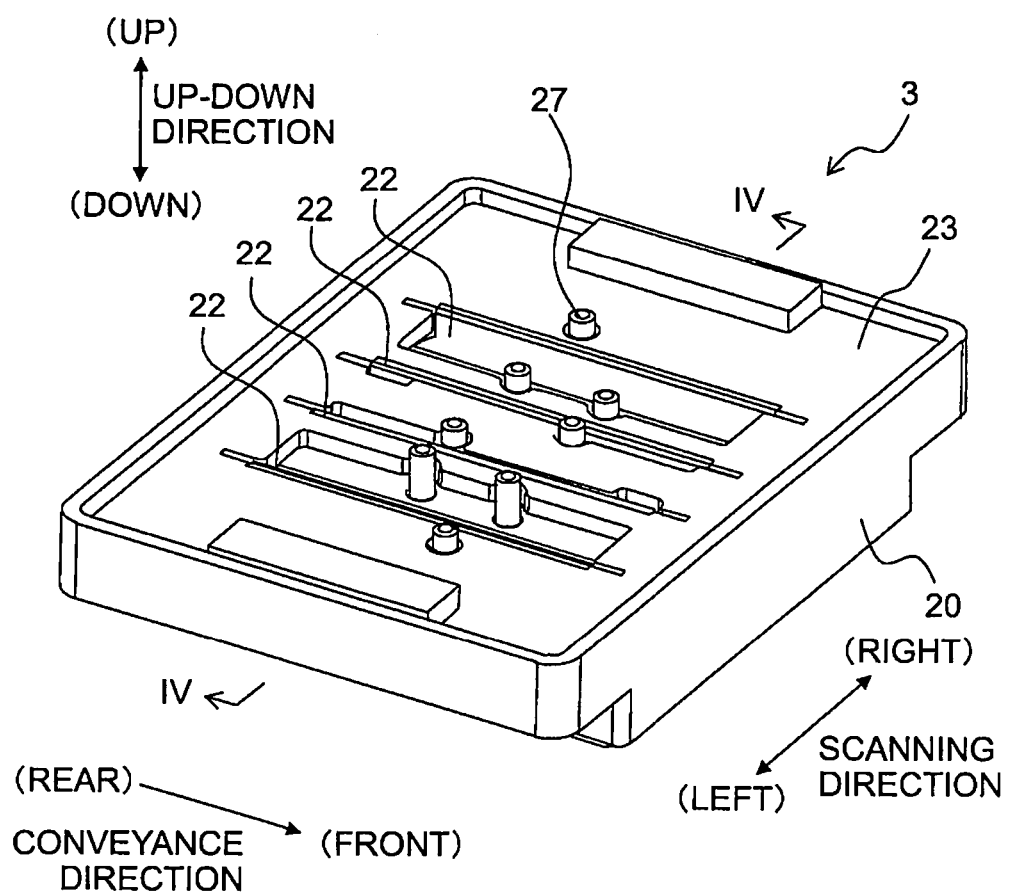
FIG. 2 is a perspective view of an ink discharge apparatus.
Figure 3:
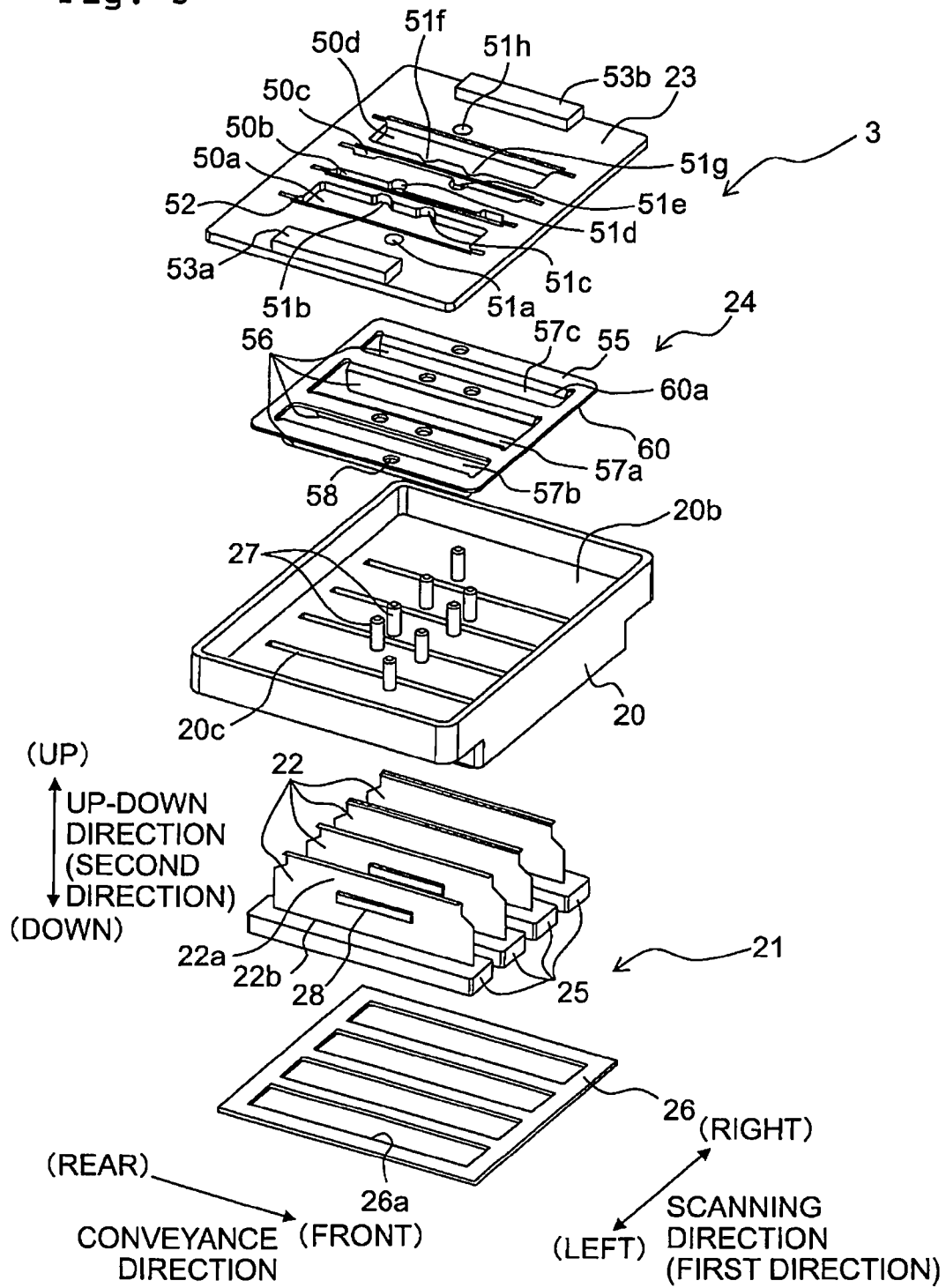
FIG. 3 is an exploded perspective view of the ink discharge apparatus.
Figure 4:
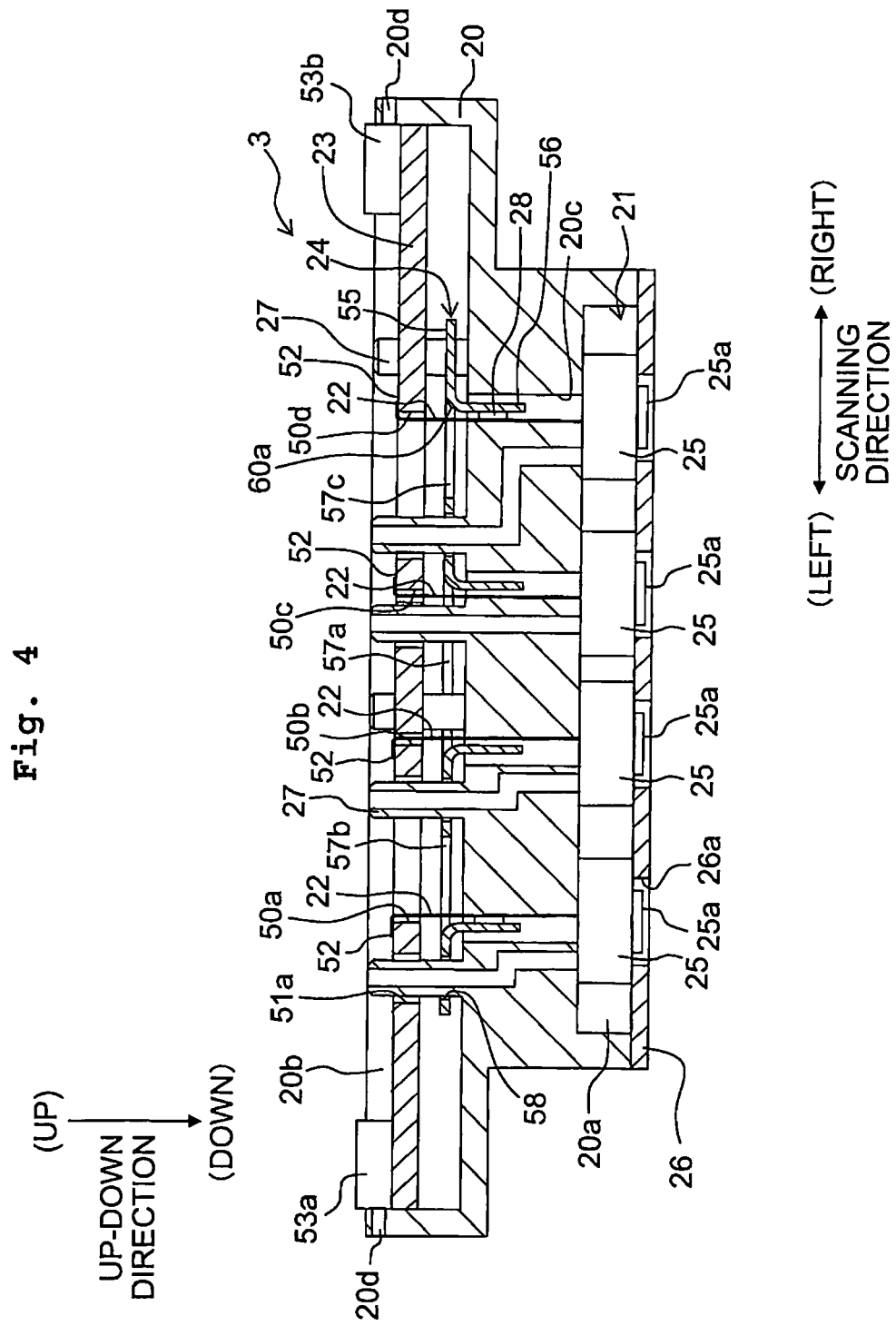
FIG. 4 is a cross-sectional view taken along a line IV-IV in FIG. 2.

Next, the detailed configuration of the ink discharge apparatus 3 will be explained. As depicted in FIGS. 2 to 4, the ink discharge apparatus 3 is provided with a head holder 20, the ink-jet head 21 having the four head units 25, four pieces of COF (Chip On Film) 22, a circuit board 23, a heat sink 24, etc.

<Head Holder>

The head holder 20 is a member having a rectangular shape (in a plane view) elongated in the scanning direction. The head holder 20 is connected to the endless belt 13 (see FIG. 1) which is driven by the driving motor 14, and reciprocates in the scanning direction along the guide rails 11 and 12. As depicted in FIGS. 3 and 4, a unit accommodating portion 20a having a concave shape is formed in a lower portion of the head holder 20, and the four head units 25 of the ink-jet head 21 are accommodated in the unit accommodating portion 20a. Further, a substrate accommodating portion 20b having a concave shape is formed in an upper portion of the head holder 20, and the circuit board 23 and the heat sink 24 are accommodated in the substrate accommodating portion 20b.

As depicted in FIGS. 3 and 4, eight pieces of cylindrical-shaped flow channel section 27 which extend upward from the bottom surface of the board accommodating portion 20b and each of which is formed with an ink flow channel are disposed in the inside of the board accommodating portion 20b of the head holder 20. The eight cylindrical-shaped flow channel sections 27 correspond respectively to eight nozzle rows 31 (to be described later on) of the four head units 25 of the ink-jet head 21. The eight cylindrical-shaped flow channel sections 27 are connected to the cartridge holder 4 (see FIG. 1), and the four color inks stored in the four ink cartridges 15, respectively, of the cartridge holder 4 are supplied to the eight cylindrical-shaped flow channel sections 27. Note that one color ink, among the four color inks, supplied from one ink cartridge 15 among the four ink cartridges 15 is supplied to two cylindrical-shaped flow channel sections 27 among the eight cylindrical-shaped flow channel sections 27. Further note that, although omitted in FIG. 4, ink flow channels connecting the eight cylindrical-shaped flow channel sections 27 and the four head units 25 are formed inside the head holder 20. As depicted in FIGS. 3 and 4, the head holder 20 is also formed with four passing holes 20c through which the four COFs 22 corresponding to the four head units 25 pass, respectively.

<Ink-Jet Head>

As depicted in FIGS. 3 and 4, the ink-jet head 21 has the four head units 25, and a unit holding plate 26 holding the four head units 25. The four head units 25 are accommodated inside the unit accommodating portion 20a of the head holder 20 in a state that the four head units 25 are arranged side by side with one another in the scanning direction, with a spacing distance therebetween.

Figure 5:
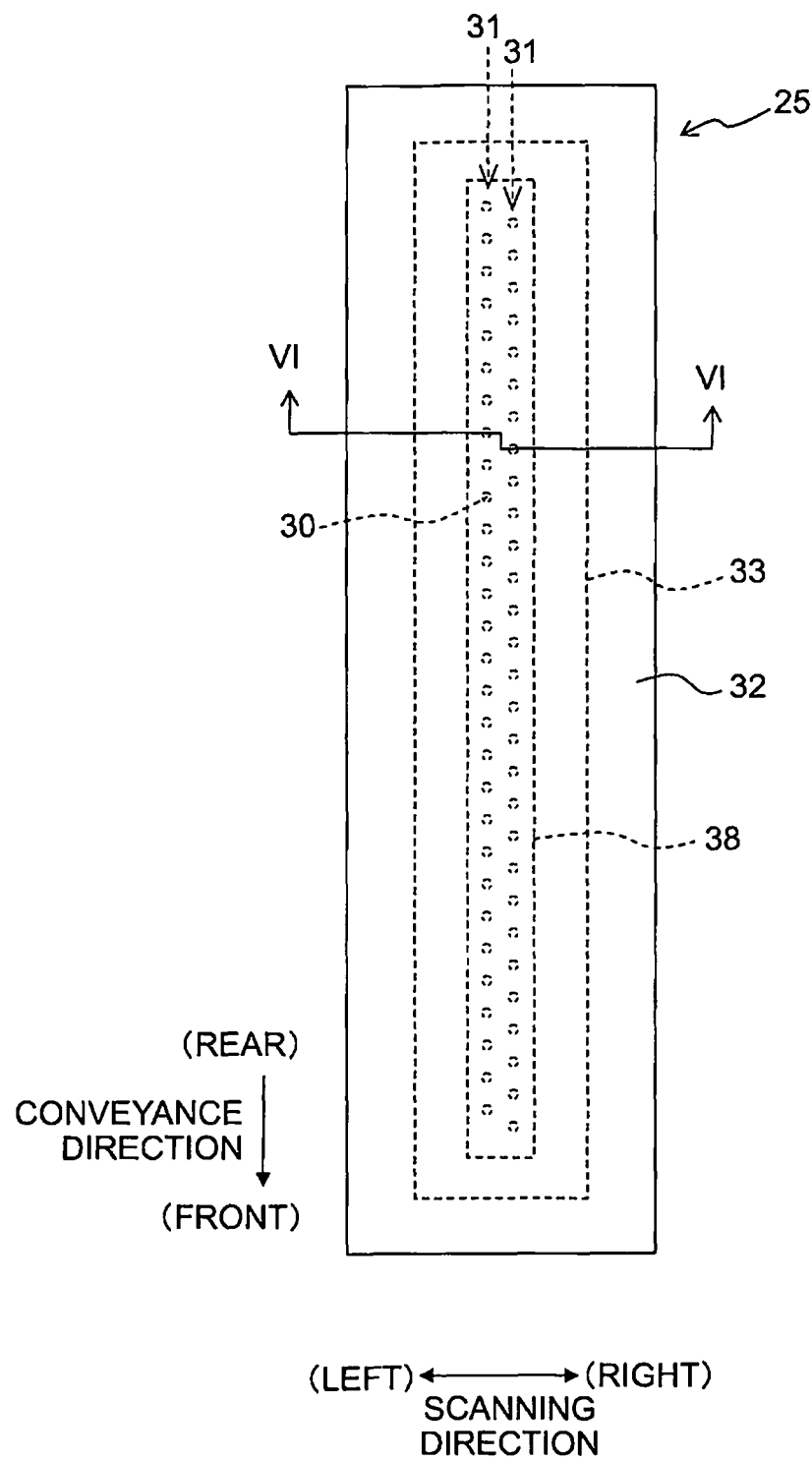
FIG. 5 is a plane view of a head unit.
Figure 6:
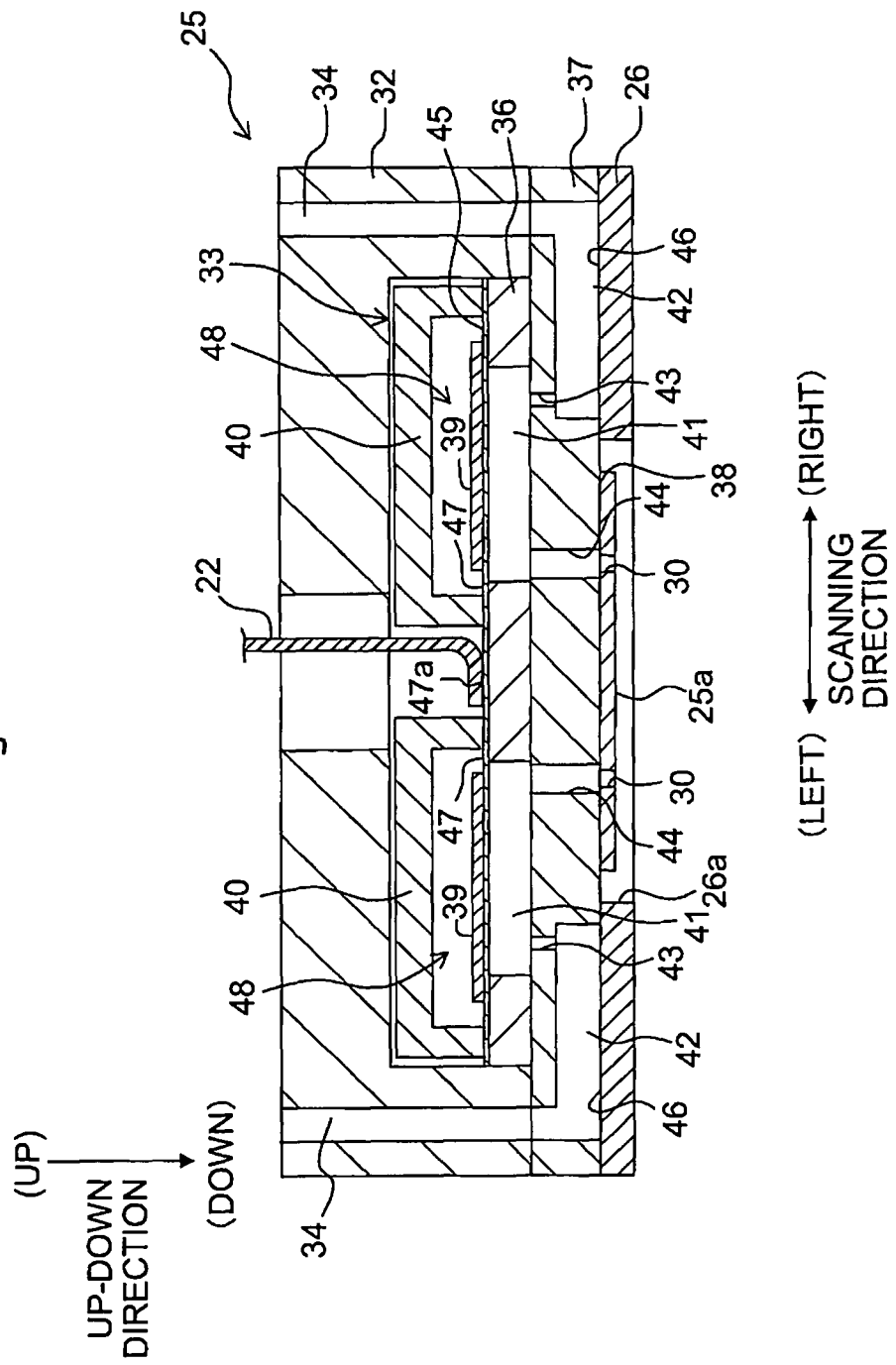
FIG. 6 is a cross-sectional view taken along a line VI-VI in FIG. 5.

As depicted in FIGS. 5 and 6, in each of the head units 25, a plurality of nozzles 30 are arranged on the lower surface thereof. An area, in the lower surface of the head unit 25, in which the nozzles of the plurality of nozzles 30 are formed is referred to as an "ink discharge surface 25a". The plurality of nozzles 30 in the ink discharge surface 25a construct two nozzles rows 31 which are aligned in the conveyance direction. Note that the two nozzle rows 31 are arranged side by side with each other in the scanning direction.

Since each one of the four head units 25 has the two nozzle rows 31, the ink-jet head 21 has a total of eight nozzle rows 31. The eight nozzles rows 31 correspond respectively to the eight cylindrical-shaped flow channel sections 27 of the head holder 20, and any one of the four color inks is supplied to each of the nozzle rows 31 from one of the cylindrical-shaped flow channel sections 27 corresponding thereto. Namely, one of the color inks supplied from one of the ink cartridges 15 (see FIG. 1) is supplied to two nozzles rows 31 among the eight nozzle rows 31, via two cylindrical-shaped flow channel sections 27 among the eight cylindrical-shaped flow channel sections 27. Note that as to which one of the eight nozzle rows 31 is allowed to discharge which one of the color inks is not limited to any particular combination of the nozzle row and the color of the inks, and a selection may be made as appropriate. For example, two nozzle rows 31 of one of the head units 25 may be configured to discharge inks of a same color. Alternatively, four kinds of the nozzle row 31 discharging the four color inks, respectively, may be arranged left-right symmetrically in the scanning direction. For example, the four kinds of the nozzle row 31 may be arranged from the center in the scanning direction toward both of the left and right sides, in an order of the black, magenta, cyan and yellow inks.

As depicted in FIGS. 3 and 4, the unit holding plate 26 has four apertures (openings) 26a in each of which the ink discharge surface 25a of one of the four head units 25 is exposed. The unit holding plate 26 is joined to the lower surface of the head holder 20 such that the unit holding plate 26 covers the four head units 25 from therebelow. Note that, however, the ink discharge surface 25a of each of the head units 25 is exposed from one of the apertures 26a of the unit holding plate 26.

Next, the configuration of the head units 25 will be specifically explained. As depicted in FIG. 5, each of the head units 25 has an outer shape which is substantially rectangular in a plane view and elongated in the conveyance direction. Further, as depicted in FIG. 6, the head unit 25 has a holder member 32 and a body 33 of the head (head body 33) held by the holder member 32. Two ink supply channels 34 are formed in the holder member 32. These two ink supply channels 34 are connected to two cylindrical-shaped flow channel sections 27 among the eight cylindrical-shaped flow channel sections 27 via ink flow channels (not depicted in the drawings) formed inside the head holder 20.

The head body 33 has a first flow channel substrate 36, a second flow channel substrate 37, a nozzle plate 38, a plurality of piezoelectric elements 39, a protective member 40, etc.

The first flow channel substrate 36 is formed with a plurality of pressure chambers 41. The plurality of pressure chambers 41 construct two pressure chamber rows which extend in the conveyance direction corresponding to the plurality of nozzles 30, and which are arranged side by side with each other in the scanning direction. Further, the first flow channel substrate 36 has a vibration film 45 covering the pressure chambers 41.

The second flow channel substrate 37 is joined to the lower surface of the first flow channel substrate 36. The second flow channel substrate 37 is formed with two manifolds 47 communicating respectively with the two ink flow channels 34 of the holder member 32. The ink supplied from the ink cartridges 15 (see FIG. 1) to the cylindrical-shaped flow channel sections 27 is supplied to the manifolds 42 via the ink flow channels 34 of the holder member 32. More specifically, the ink supplied from one of the ink cartridge 15 to two cylindrical-shaped flow channel section 27 among the eight cylindrical-shaped flow channel section 27 corresponding thereto is supplied to the two manifolds 42 via the two ink flow channels 34 of the holder member 32.

The two manifolds 42 extend in the conveyance direction (direction perpendicular to the sheet surface of FIG. 6) respectively at areas in each of which one of the manifolds 42 overlaps with the pressure chambers 41 of the first flow channel substrate 36. The lower end of each of the manifolds 42 is covered by a film 46 made of a synthetic resin. Further, the unit holding plate 26 holding the head units 25 is arranged on the lower side of the films 46. The second flow channel substrate 37 is formed with a plurality of communicating holes 43 each of which communicates one of the pressure chambers 41 with either one of the two manifolds 42. Furthermore, the second flow channel substrate 37 is also formed with a plurality of communicating holes 44 each communicating one of the pressure chambers 41 with one of the nozzles 30 formed in the nozzle plate 38 (to be described below).

The nozzle plate 38 is joined to the lower surface of the second flow channel substrate 37. The nozzle plate 38 is formed with the plurality of nozzles 30 aligned in the conveyance direction. As described above, the plurality of nozzles 30 constitute two nozzle rows 31. Each of the nozzles 30 is communicated with one of the pressure chambers 41 formed in the first flow channel substrate 36, via one of the communicating holes 44 formed in the second flow channel substrate 37.

The piezoelectric elements 39 are arranged on the upper surface of the vibration film 45 which is parallel to the ink discharge surface 25a. The plurality of piezoelectric elements 39 are aligned in the conveyance direction corresponding to the plurality of pressure chambers 31, respectively, and constitute two piezoelectric element rows 48 which are arranged side by side with each other in the scanning direction. Each of the piezoelectric elements 39 causes the vibration film 45 to vibrate by using the piezoelectric deformation generated when the voltage applied to the piezoelectric element 39 is changed, to thereby impart a discharge energy to the ink inside a certain pressure chamber 41, among the plurality of pressure chambers 41, corresponding to the piezoelectric element 39 so that the ink is discharged from one of the nozzles 30 corresponding to the certain pressure chamber 40. Drive traces 47 are connected to the piezoelectric elements 39, respectively, and a predetermined driving voltage is applied to each of the piezoelectric element 39 via one of the drive traces 47 connected thereto. Each of the drive traces 47 is drawn from one of the piezoelectric elements 39 toward the inner side in the scanning direction. An end portion, of each of the drive traces 47, on a side opposite to one of the piezoelectric elements 39 corresponding thereto is provided with a drive contact point 47a to which a COF 22 (to be described later on) is connected. The drive contact points 47a of the plurality of drive traces 47 are arranged on the upper surface, of the vibration film 45 in the first flow channel substrate 36, at an area between the two piezoelectric element rows 48.

Two pieces of the protective member 40 covering the two piezoelectric element rows 48, respectively, are arranged on the upper surface of the vibration film 45 of the first flow channel substrate 36. The protective members 40 are arranged for the purpose of, for example, shielding the piezoelectric elements 39 from the outside air, preventing the piezoelectric elements 39 from contacting moisture, and the like.

<COF>

As depicted in FIG. 4, a COF 22 as a member (a wiring member or a trace member) is connected to each of the head units 25. More specifically, in each of the head units 25, an end portion of the COF 22 is arranged between the two piezoelectric element rows 48 on the left and right sides, respectively, and is electrically connected to the plurality of drive contact points 47 which are drawn from the plurality of piezoelectric elements 39, respectively, as depicted in FIG. 6. Further, as depicted in FIGS. 3 and 4, four pieces of the COF 22 are extend upward respectively from the four head units 25 in a state that the four COFs 22 are arranged side by side with one another in the scanning direction, and are connected to the circuit board 23 (to be described later on). Intermediate portions, of the respective four COFs 22, in the up-down direction are provided with four pieces of IC 28, respectively. Each of the four ICs 28 supplies a driving signal to the plurality of piezoelectric elements 39 of one of the head units 25 corresponding thereto, based on a signal input from the circuit board 23 to the IC 28, thereby changing the voltage applied to the piezoelectric elements 39.

Figure 9A:
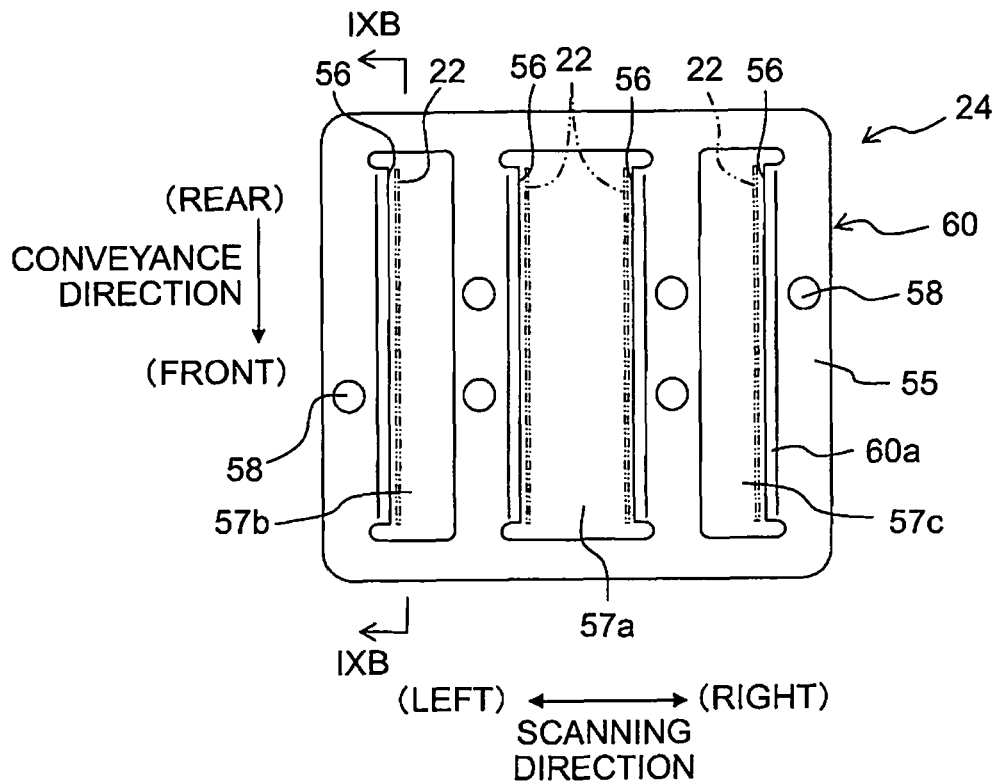
Figure 9B:
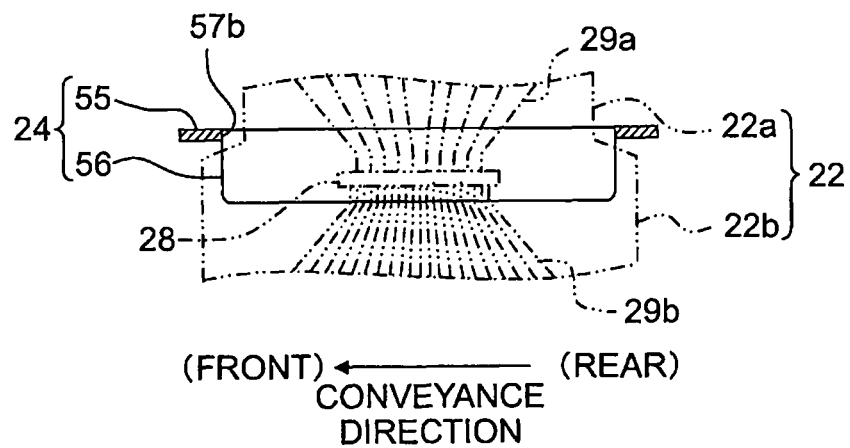

As depicted in FIG. 9B, a plurality of input traces 29a electrically connecting the circuit board 23 and the IC 28 are arranged in a first portion 22a, of the COF 22, between the IC 28 and the circuit board 23. The input traces 29a transmit a signal for controlling the IC 28 from the circuit board 23 toward the IC 28. On the other hand, a plurality of output traces 29b electrically connecting the IC 28 and the plurality of piezoelectric elements 39 of each of the head units 25 are arranged in a second portion 22b, of the COF 22, between the IC 28 and the head unit 25. The output traces 29b transmit the driving signal output from the IC 28 to the piezoelectric elements 39. Here, since the number of piezoelectric elements 39 (namely, the number of nozzles 30) per the head unit 25 is generally great, the number of the output traces 29b connected to the output terminals of the IC 28 is greater than the number of input traces 29a connected to the input terminals of the IC 28. Namely, the input traces 29a arranged in the first portion 22a, of the COF 22, between the IC 28 and the circuit board 23 is smaller than the number of the output traces 29b arranged in the second portion 22b of the COF 22. Accordingly, as depicted in FIG. 3 and FIG. 9B, the width of the first portion 22a of the COF 22 is made to be smaller than the width of the second portion 22b of the COF 22.

<Circuit Board>

Figure 7:
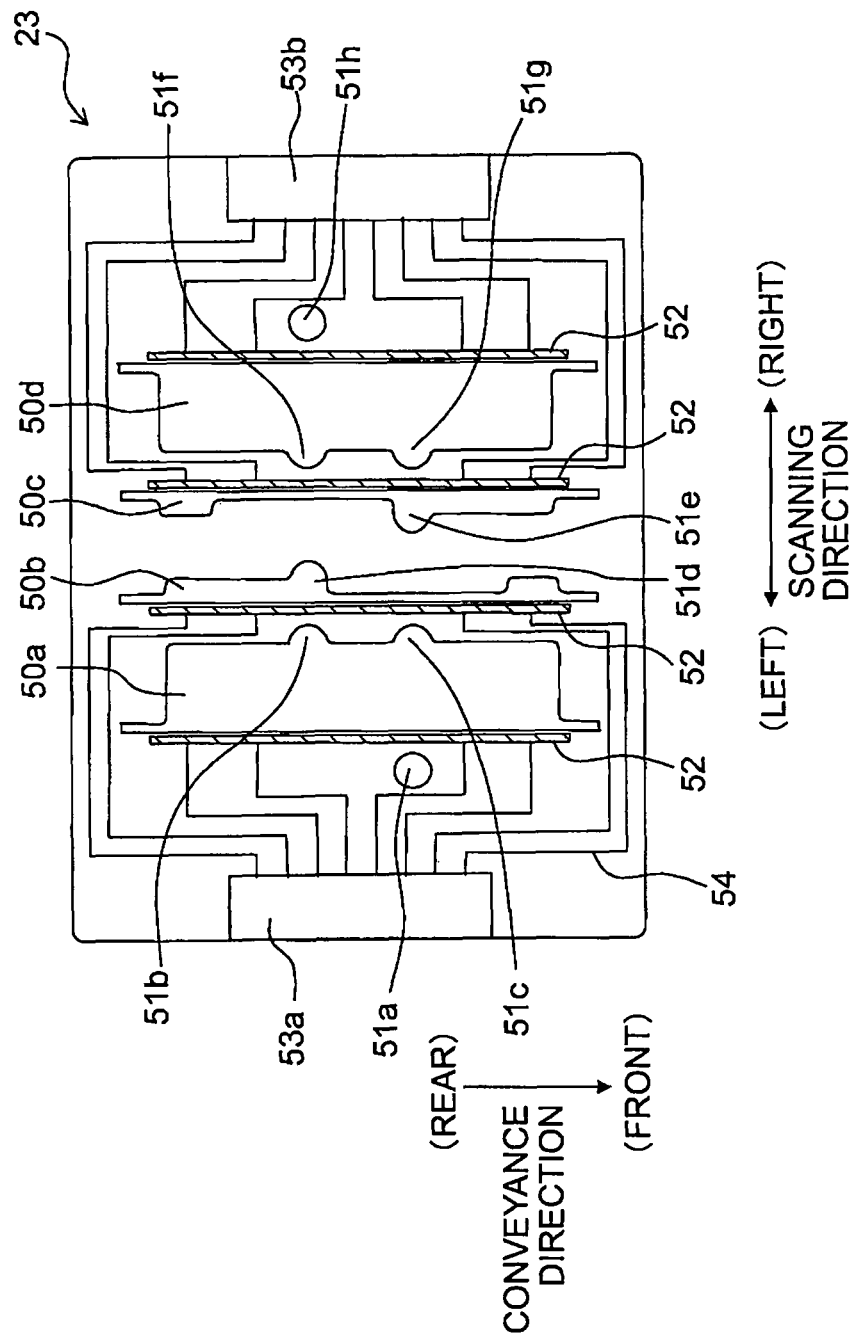
FIG. 7 is a top view of a circuit board.

As depicted in FIGS. 2 to 4, the circuit board 23 is arranged at a position above the four head units 25 with the head holder 20 interposed therebetween, and is accommodated in the board accommodating portion 20b of the head holder 20. The circuit board 23 is arranged to be overlapped with the four head units 25 in the up-down direction. As depicted in FIG. 7, connectors 53a, 53b are arranged respectively at left and right end portions on the upper surface of the circuit board 23. Note that in the following explanation, in a case that there is no need to particularly distinguish the connector 53a from the connector 53b, the connectors are simply referred to as "connector(s) 53" in some cases. Similarly, also regarding other constitutive components which are different from the connectors 53 (53a, 53b), the reference numerals thereof are abbreviated by omitting letters as suffixes such as "a", "b", etc. Further, insert ports 20d (see FIG. 4), into which non-illustrated trace members for connecting the circuit board 23 with the controller 6 (see FIG. 1) are inserted, are formed in left and right wall portions, respectively, of the head holder 20. Note that the connectors 53 may be formed on the lower surface of the circuit board 23, or the connectors 53 may be formed respectively on the upper and lower surfaces of the circuit board 23. The circuit board 23 is formed with four through holes 50a to 50d for allowing the four COFs 22, extending from the four head units 25 arranged below the circuit board 23, to penetrate therethrough, in a state that the four through holes 50a to 50d are arranged side by side with one another in the scanning direction. Further, the circuit board 23 is formed also with eight flow channel holes 51a to 51h for allowing the eight cylindrical-shaped flow channel sections 27, of the head holder 20, to penetrate therethrough. Note that in the embodiment, although six flow channel holes 51b to 51g, among the eight flow channel holes 51a to 51h, are joined (continued) to the through holes 50 (50a to 50d), it is allowable that the through holes 50 and the flow channel holes 51 are not joined with one another, and that the through holes 50 and the flow channel holes 51 are provided independently from one another.

As depicted in FIG. 4, four connection terminals 52 are provided on the upper surface of the circuit board 23, respectively at locations in the vicinity of edge portions of the four through holes 50a to 50d. More specifically, with respect to the two through holes 50a and 50b located on the left side, the connection terminals 52 are disposed each on the left side of the through hole 50a or 50b (on the side of the connector 53a). On the other hand, with respect to the two through holes 50c and 50d located on the right side, the connection terminals 52 are disposed each on the right side of the through hole 50c or 50d (on the side of the connector 53b). The two connection terminals 52 on the left side are connected to the connector 53a on the left side via a trace 54 (see FIG. 7) and a non-illustrated circuit element which are arranged on the circuit board 23. Similarly, the two connection terminals 52 on the right side are connected to the connector 53b on the right side via the trace 54 and a non-illustrated circuit element which are arranged on the circuit board 23. Each of the COFs 22 is connected to one of the connection terminals 52 arranged on the upper surface of the circuit board 23, while passing through one of the through holes 50 (50a to 50d) corresponding thereto.

<Heat Sink>

In order to suppress the difference in temperature of the ink among the four head units 25 to be small, the heat sink 24 has a function as a soaking member configured to soak (thermally average) the heat generated in the respective four ICs 28 and a function as a heat radiating member configured to radiate the heat to the outside. The heat sink 24 is formed, for example, of a metallic material with a high thermal conductivity, such as aluminum, etc.

As depicted in FIGS. 3 and 4, the heat sink 24 is arranged between the four head units 25 and the circuit board 23. Further, the heat sink 24 is arranged at a location below the circuit board 23 with a spacing distance (gap) with respect to the circuit board 23. As depicted in FIGS. 3, 4, 8 and 9, the heat sink 24 has a body portion 55 extending along a plane parallel to the ink discharge surface 25a and arranged to straddle over the four head units 25, and four projections 56 each projecting downward from the body portion 55. The four projections 56 are arranged side by side with one another in the scanning direction, corresponding to the four COFs 22 extending from the four head units 25, respectively. Further, each of the projections 56 extends not only in the up-down direction but also in the conveyance direction. The length of each of the projections 56 in the conveyance direction is made to be greater than the length of each of the projections 56 in the up-down direction.

Figure 8:
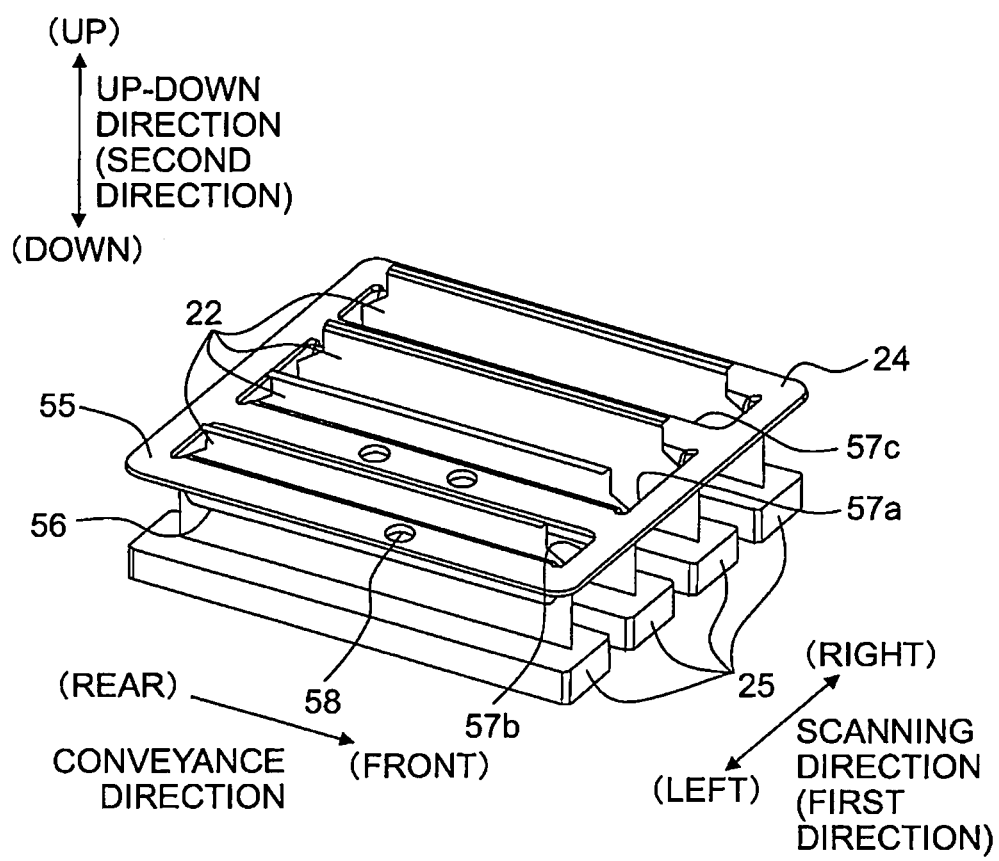
FIG. 8 is a perspective view of four head units and a heat sink.

The body portion 55 is formed with three trace through holes 57a to 57c (hereinafter also referred to as "trace through holes 57" in some cases) arranged side by side with one another in the scanning direction. The COFs 22 extending toward the circuit board 23 respectively from the head units 25 penetrate the body portion 55 in the up-down direction at the trace through holes 57, respectively. Each of the three trace through holes 57a to 57c is a rectangular-shaped hole having a shape elongated in the conveyance direction. The trace through hole 57a located in the center in the scanning direction has a width in the scanning direction greater than those of the two trace through holes 57b and 57c located on the left and right sides in the scanning direction. Among the four COFs 22 in the four head units 25, two COFs 22 connected to central two head units 25 among the four head units 25 pass through the central trace through hole 57a in the heat sink 24. In other words, trace through holes through which the two central COFs 22 pass are joined or linked together so as to form one trace through hole 57a. The COF 22 of the head unit 25 on the left side (left end) passes through the trace through hole 57b on the left side in the heat sink 24, and the COF 22 of the head unit 25 on the right side (right end) passes through the trace through hole 57c on the right side in the heat sink 24. Further, as depicted in FIGS. 8 and 9B, each of the COFs 22 penetrates through one of the trace through holes 57 at the first portion 22a having the small width and located between the IC 28 and the circuit board 23.

The two projections 56 extend downward respectively from two edge portions on the left and right sides of the central trace through hole 57a. Further, two ICs 28 provided respectively on the two COFs 22 penetrating through the central trace through hole 57a are supported in a state that the two ICs 28 are brought into contact respectively with the two projections 56 in the center. Furthermore, one projection 56 extends downward from the left edge portion of the trace through hole 5ib on the left side; and the IC 28 provided on the COF 22 penetrating through the trace through hole 57b on the left side is supported in a state that the IC 28 is brought into contact with the projection 56 extending downward from the left edge portion of the trace through hole 57b on the left side. Moreover, one projection 56 extends downward also from the right edge portion of the trace through hole 57c on the right side; and the IC 28 provided on the COF 22 penetrating through the trace through hole 57c on the right side is supported in a state that the IC 28 is brought into contact with the projection 56 extending downward from the right edge portion of the trace through hole 57c on the right side.

When driving the plurality of piezoelectric elements 39 of the head units 25 by the ICs 28, the heat is generated in the ICs 28. The heat generated in the respective ICs 28 is transferred to the projections 56 of the heat sink 24, and is transferred further to the body portion 55 continued or linked to the four projections 56. The heat generated in the four ICs 28 is soaked in the body portion 55, and a portion of the heat is radiated from the body portion 55 to the outside air surrounding the body portion 55.

In order to transfer the heat generated in the ICs 28 quickly from the projections 56 to the body portion 55, the ICs 28 can be brought into contact directly with the projections 56, as described above. However, from the viewpoint of causing the ICs 28 to be supported by the projections 56 in an ensured manner so that the ICs 28 are prevented from separating from the projections 56, the ICs 28 may be joined to the projections 56 by an adhesive. In such a case, the ICs 28 are consequently supported by the projections 56 via the adhesive.

A total of six pieces of flow channel through hole 58 are formed in the body portion 55, at areas between the three trace through holes 57a to 57c, an area on the left side with respect to the trace through hole 57b on the left side, and an area on the right side with respect to the trace through hole 57c on the right side. As depicted in FIGS. 2 and 4, each of the cylindrical-shaped flow channel sections 27 of the head holder 20 penetrates through the body portion 55 in the up-down direction at one of the flow channel through holes 58. Note that although only six pieces of the flow channel through hole 58 are formed in the body portion 55 of the heat sink 24 with respect to the eight pieces of the cylindrical-shaped flow channel sections 27 of the head holder 20, the remaining two cylindrical-shaped flow channel sections 27 penetrate through the body portion 55 at the central trace through hole 57a having the large width. Accordingly, there is no need to provide any flow channel through hole(s) 58 corresponding to the remaining two cylindrical-shaped flow channel sections 27.

Figure 10:
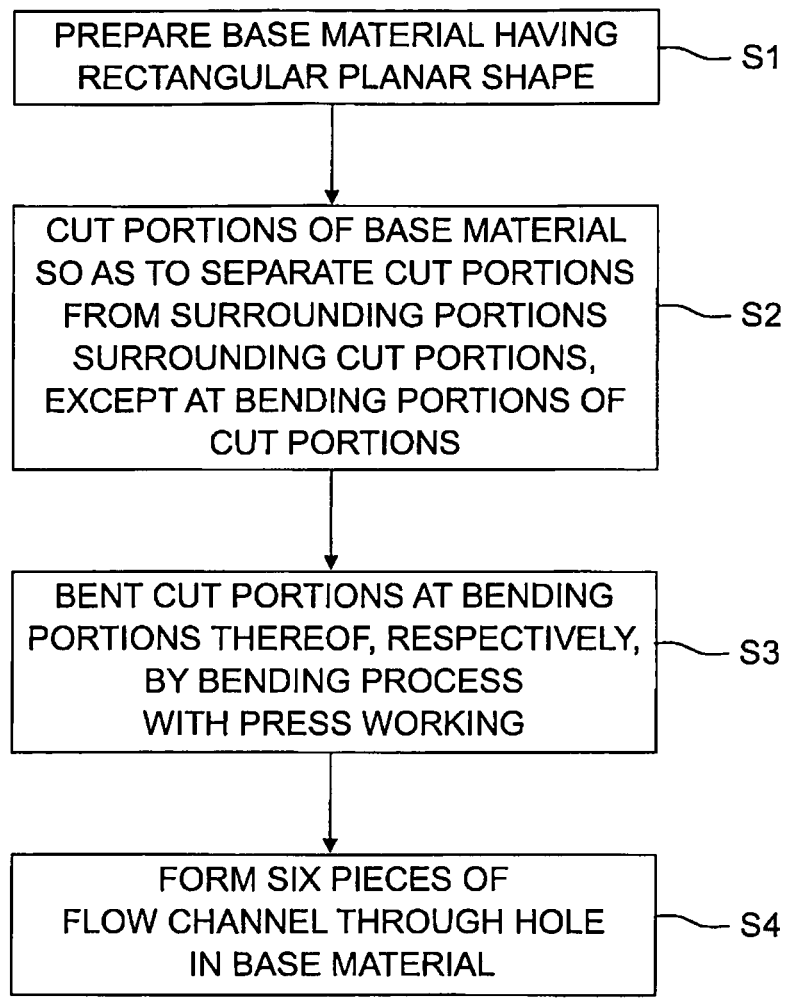
FIG. 10 is a flowchart depicting a method for producing a heat sink according to the embodiment.

Note that the heat sink 24 having the above-described shape is formed by subjecting a sheet-shaped (plate-shaped) base material 60 made of a metal such as aluminum, etc. to a press working. A method for producing the heat sink 24 will be explained with reference to FIG. 10. At first, a base material 60 having a rectangular planar shape of which longitudinal direction is parallel to the scanning direction is prepared as the base material based on which the heat sink 24 is formed (S1). Then, portions of the base material 60 are cut and separated from surrounding portions surrounding these portions, respectively, but these portions are not cut and not separated from the surrounding portions at bending portions 60a, respectively, of the base material 60, which are continued to the portions which have been cut and separated, respectively (S2). Afterwards, the cut and separated portions are bent, by a bending process by the press working, respectively at the bending portions 60a (S3). Note that the steps of S1 and S2 may be performed in order (in a sequential manner), or may be performed at the same time.

The portions, of the base material 60, which are bent at the bending portions 60a, become the projections 56 extending downward, and the remaining portion of the base material 60 becomes the body portion 55 extending along a horizontal plane. Further, the apertures or openings which are formed to be open in the base material 60 by bending the projections 56 downward become the trace through holes 57. Furthermore, the six flow channel through holes 58 are formed in the base material 60 by a stamping or punching processing (S4). The order for performing the steps of S2 and S3 and the step S4 can be determined appropriately.

Since the portions of the base material 60 which are bent by the press working become the projections 56 as described above, the shape and area of the projections 56 correspond mutually to the shape and area of the trace through holes 57 formed in the body portion 55 by bending the portions which are to become the projections 56.

In the present embodiment, the four ICs 28 are supported by the four projections 56, respectively, of the heat sink 24. Accordingly, the heat generated in the respective ICs 28 is transferred from the projections 56 to the body portion 55. With this, the heat generated in each of the four ICs 28 is soaked in the body portion 55 of the heat sink 24, the temperature is made uniform among the four ICs 28 and among the four COFs 22. Owing to this, the variation in the temperature of the ink is made to be small among the four head units 25, and any variation in the discharge characteristic of the nozzles 30 is suppressed among the four head units 25.

Further, the heat sink 24 is arranged between the four head units 25 and the circuit board 23 in the up-down direction. Namely, the heat sink 24 is arranged at a location closer to the head units 25 than the circuit board 23. With this, the distance between the head units 25 and the ICs 28 supported by the projections 56 of the heat sink 24 is made to be small, thereby making it possible to suppress the trace resistance between the ICs 28 and the piezoelectric elements 39 to be low.

Furthermore, each of the four projections 56 of the heat sink 24 extends downward from the body portion 55 extending in the horizontal direction. Accordingly, there is no need to make the COFs 22 which extend in the up-down direction to route in the horizontal direction, for the purpose of supporting the ICs 28 disposed on the COFs 22 by the projections 56. With this, it is possible suppress the size, of the ink discharge apparatus 3, along the plane parallel to the ink discharge surface 25a, to be small.

The body portion 55 and the four projections 56 of the heat sink 24 are formed by bending the portions of the plate-shaped base material 60 by the press working. Namely, the portions of the base material 60 which are bent become the projections 56, and the remaining portion of the base material 60 becomes the body portion 55. Further, the portions which are opened by the bending of the base material 60 become the trace through holes 57 through which the COFs 22 pass. In this configuration, by bending the portions of the base material 60 with the press working, it is possible to form the four projections 56 and to form the three trace through holes 57a to 57c allowing the COFs 22 to penetrate therethrough, at the same time.

Note that since the four projections 56 are formed by the bending with the press working, the area of the trace through holes 57 also becomes great depending on the dimension (size) of the projections 56. In a case that the length of the projections 56 is great, the width in the scanning direction of the trace through holes 57 becomes great. In other words, in a case that the length in the up-down direction (second direction) of the projections 56 is great, the width in the scanning direction of the trace through holes 57 becomes great. In such a situation, the pitch in the scanning direction among the three trace through holes 57a to 57c becomes great, which in turn consequently forces the spacing distance in the scanning direction among the head units 25 to be great as well. In order to prevent the size of the trace through hole 57a from becoming great, the length of the projections 56 can be made as short as possible. On the other hand, from the viewpoint of suppressing the electric resistance between the ICs 28 and the plurality of piezoelectric elements 39 of the head units 25 to be small, the ICs 28 supported by the projections 56 can be arranged at positions as close as possible to the head units 25. In this regard, since the present embodiment allows the heat sink 24 to be arranged between the circuit board 23 and the four head units 25, the ICs 28 can be arranged closely to the head units 25 while shortening the length of the projections 56.

In a case that the area of the trace through holes 57 which are formed in the body portion 55 and through which the COFs 22 penetrate is great, the area of the body portion 55 became small to the extent of the greatness of the area of the trace through holes 57, which in turn lowers the heat-dissipating effect. With respect to this point, in a case that the area of the trace through holes 57 is great, there is generated a portion with a small width in an area surrounding each of the trace through holes 57, namely in an area spanning from the edge of the trace through hole 57 up to the outer edge of the body portion 55. Since the heat resistance becomes great in such a portion having the small width, the rising of the temperature in the ICs 28 also consequently becomes great. With respect to this point, in the present embodiment, the first portion 22a, of the COF 22, disposed between the IC 28 and the circuit board 23 and having the small width is allowed to pass through the trace through hole 57, as depicted in FIG. 9B. With this, the opening area (aperture area) of the trace through hole 57 can be made small.

As depicted in FIG. 4, the COFs 22 are electrically connected respectively to the connection terminals 52 which are disposed in the circuit board 23, while passing through the through holes 50 formed in the circuit board 23. Further, as depicted in FIG. 7, the connection terminals 52 are connected to the connectors 53 by the trace 54 and the circuit elements (not depicted in the drawings) formed on the circuit board 23. Here, the two connection terminals 52 connected respectively to the two COFs 22 on the left side are each arranged on the left side (on the side closer to the connector 53a) with respect to the through hole 50. Further, the two connection terminals 52 connected respectively to the two COFs 22 on the right side are each arranged on the right side (on the side closer to the connector 53b) with respect to the through hole 50. With this, it is possible to make the distance between the connection terminals 52 and the connectors 53 shorter on the circuit board 23, and to easily arrange the trace 54, etc., connecting the connection terminals 52 and the connectors 53.

Note that in order to connect each of the COFs 22 to one of the connection terminals 52 arranged on the side closer to the connector 53 than the through hole 50, each of the COFs 22 can be arranged in the through hole 50, of the circuit board 23, closely to the edge portion, of the through hole 50, located on the side of the connector 53. In this regard, the heat sink 24 which is arranged to overlap with the circuit board 23 is formed with the three trace through holes 57 (57a to 57c) through which the COFs 22 pass. Further, the projections 56 extend downward from the edge portion, located on the side of the connector 53, of the trace through holes 57, respectively. With this, the COFs 22 extends toward the circuit board 23 from the projections 56 by which the ICs 28 are supported, while passing through the edge portions, of the trace through holes 57, which are located on the side of the connectors 53, respectively. Accordingly, also in the circuit board 23, the COFs 22 can be easily arranged so that each of the COFs 22 passes the portion in the vicinity of the edge portion, of the through hole 50, which is located on the side of the connector 53.

In the embodiment as explained above, the ink discharge apparatus 3 corresponds to the "liquid discharge apparatus" of the present teaching; the head unit(s) 25 correspond(s) to the "first liquid discharge head" and the "second liquid discharge head" of the present teaching; the piezoelectric element(s) 39 of the head unit 25 correspond(s) to the "driving element(s)" of the present teaching; the piezoelectric element row 48 corresponds to the "driving element row" of the present teaching; the COF 22 corresponds to the "first member" or the "second member" of the present teaching; the output trace 29 of the COF 22 corresponds to the "first trace" or the "second trace" of the present teaching, the first member and/or the second member of the present teaching may be a flexible printed circuit (FPC); the heat sink 24 corresponds to the "metallic member" of the present teaching; the scanning direction in which the four head units 25 are arranged side by side with one another corresponds to the "first direction" of the present teaching; the up-down direction corresponds to the "second direction" of the present teaching; and the cylindrical-shaped flow channel section(s) 27 correspond(s) to the "flow channel forming member(s)" of the present teaching.

Note that among the four head units 25, each of the two head units 25 on the left side is the "first liquid discharge head" of the present teaching, and each of the two head units 25 on the right side is the "second liquid discharge head" of the present teaching. Further, the classification of the "first" and "second" in the "member", the "projection", the "connection terminal", etc., is same as the classification of the "first" and "second" in the above-described liquid discharge heads. Namely, the COF 22, the projection 56, and the connection terminal 52 corresponding to the head unit 25 located on the left side correspond to the "first member", the "first projection" and the "first connection terminal", respectively, of the present teaching. Further, the COF 22, the projection 56, and the connection terminal 52 corresponding to the head unit 25 located on the right side correspond to the "second member", the "second projection" and the "second connection terminal", respectively, of the present teaching.

Next, an explanation will be given about modifications in which various changes are made to the above-described embodiment. However, any parts or components each having a configuration similar to that in the above-described embodiment are designated with same reference numerals, and explanation thereof is omitted as appropriate.

In the above-described embodiment, since each of the four projections 56 are elongated (extended) in the conveyance direction as depicted in FIGS. 8 and 9, the heat sink 24 has a high rigidity with respect to any bending along the conveyance direction, owing to the presence of the four projections 56. However, in a case that the heat sink 24 is provided only with the four projections 56, the rigidity of the heat sink 24 with respect to any bending along the scanning direction orthogonal to the conveyance direction remains to be low.

In view of this, it is allowable that edge portions 61, of the base material 60 which is to become the heat sink 24, along the conveyance direction may be bent as depicted in FIGS.

11 and 12. With this, the rigidity of the heat sink 24 along the scanning direction is enhanced. Further, only by bending the edge portions 61, without increasing the entire thickness of the base material 60, the rigidity can be enhanced with a low cost.

Figure 11:
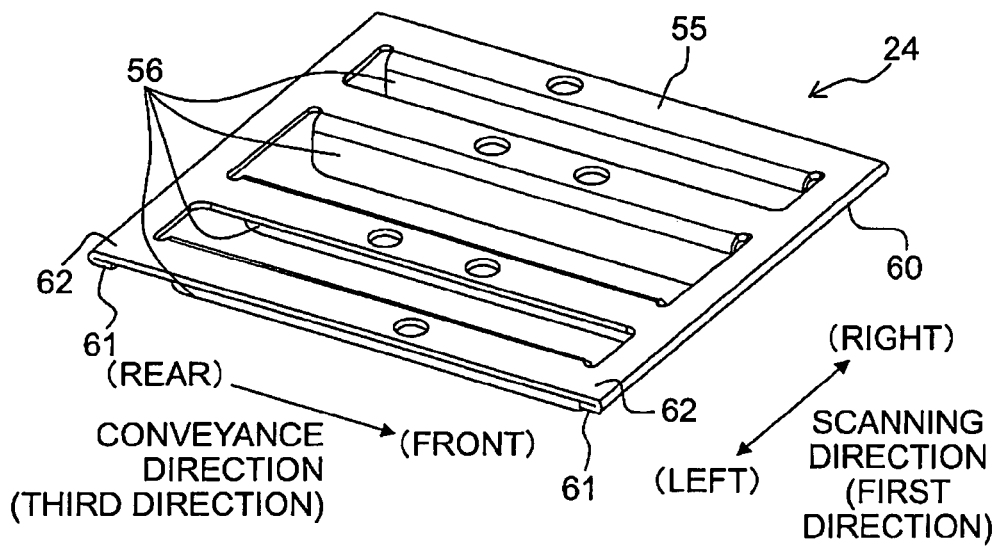
FIG. 11 is a perspective view of a heat sink according to a modification.

Furthermore, in the modification depicted in FIG. 11, not only that the edge portions 61 of the base material 60 in the conveyance direction are bent, but also the bent edge portions 61 are folded and overlapped with continuing portions 62 which are continued to the edge portions 61. Namely, the edge portions 61 and the continuing portions 62 continued to the edge portions 61 are brought into surface contact with each other. In this configuration, since a portion of which thickness is substantially increased is formed in the body portion 55 of the heat sink 24, the heat resistance of the body portion 55 of the heat sink 24 is lowered, thereby making it possible to suppress any increase in the temperature in the ICs 28.

Figure 12:
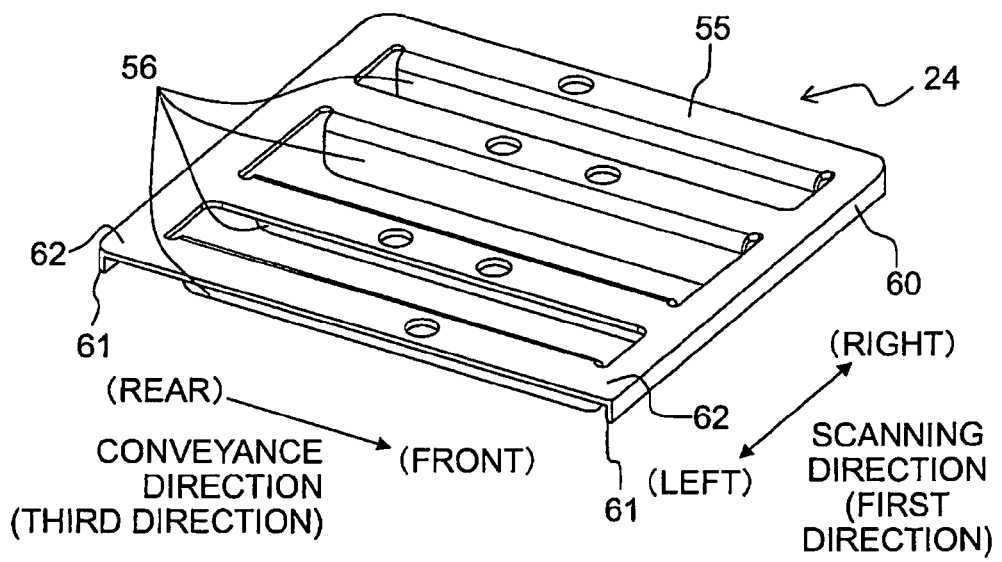
FIG. 12 is a perspective view of a heat sink according to another modification.

On the other hand, it is allowable, as depicted in FIG. 12, that the edge portions 61 of the base material 60 in the conveyance direction are bent, but not folded and not overlapped with the continuing portions 62 continued to the edge portions 61. In such a case, the surface area of the body portion 55 of the heat sink 24 is increased by the bending of the edge portions 61 of the base material 60, which is advantageous in view of the heat dissipation from the heat sink 24, as compared with the configuration depicted in FIG. 9A.

Note that in the aspects depicted in FIGS. 11 and 12, only one edge portion 61, among the two edge portions 61 of the base material 60 in the conveyance direction, may be bent. Alternatively, in addition to the bending of the edge portions 61 in the conveyance direction, an edge portion or edge portions of the base material 60 in the scanning direction may also be bent. Note that in the conveyance direction in the aspects depicted in FIGS. 11 and 12 corresponds to the "third direction" of the present teaching.

Figure 13:
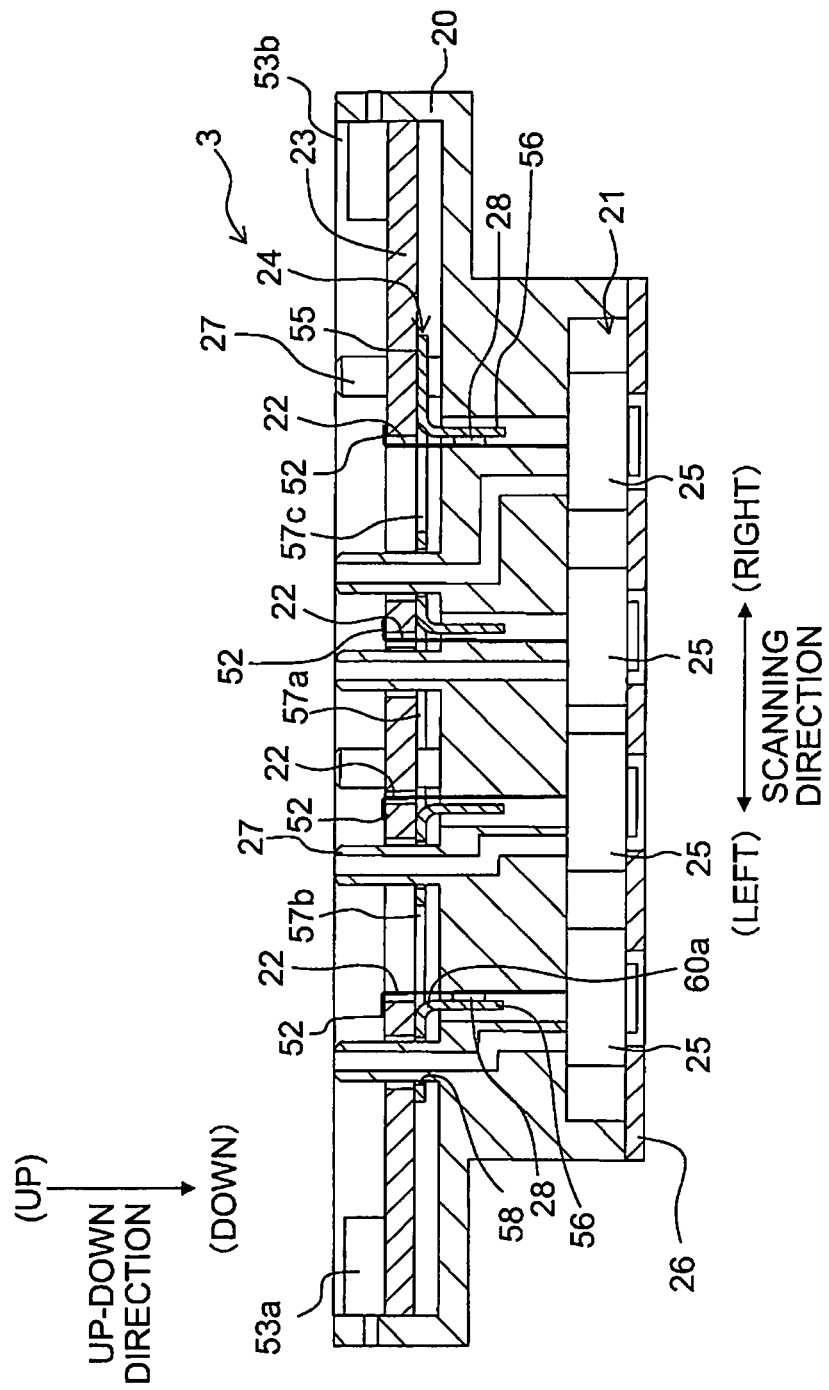
FIG. 13 is a cross-sectional view of an ink discharge head according to still another modification.

In the above-described embodiment, the heat sink 24 arranged at the location below the circuit board 23 is arranged with a spacing distance (gap) with respect to the circuit board 23 (see FIG. 4). Alternatively, it is allowable that the heat sink 24 is brought into contact with the circuit board 23, as depicted in FIG. 13. In such a case, when the COFs 22 are pressed against the connection terminals 52 of the circuit board 23 so as to connect the COFs 22 to the connection terminals 52, respectively, the pressing force from the COFs 22 can be received by the heat sink 24, thereby making it possible to connect the COFs 22 with the connection terminals 52 in an ensured manner.

Further, in FIG. 13, each of the connection terminals 52 connected to the COFs 22 respectively is arranged in the circuit board 23 in the vicinity of a portion (overlapping portion) of the circuit board 23 which is overlapped with one of the bent portions 60a located between the body portion 55 and the projections 56 of the heat sink 24. In this configuration, the bent portions 60a, of the base material 60, having the high rigidity are present at positions immediately below the connection terminals 52, respectively, of the circuit board 23. Accordingly, when connecting the COFs 22 to the connection terminals 52 of the circuit board 23, it is possible to press the COFs 22 sufficiently against the circuit board 23, thereby realizing the electrical connection in an ensured manner.

Note that the rigidity is low in the portions, in the body portion 55, at which the flow channel through holes 58 are formed. In view of this, as depicted in FIG. 13, the flow channel through holes 58 can be formed in the body portion 55 at positions not overlapping with the connection terminals 52 of the circuit board 23, namely at positions to which any great pressing force is not applied when the COFs 22 are connected to the circuit board 23.

Figure 14A:
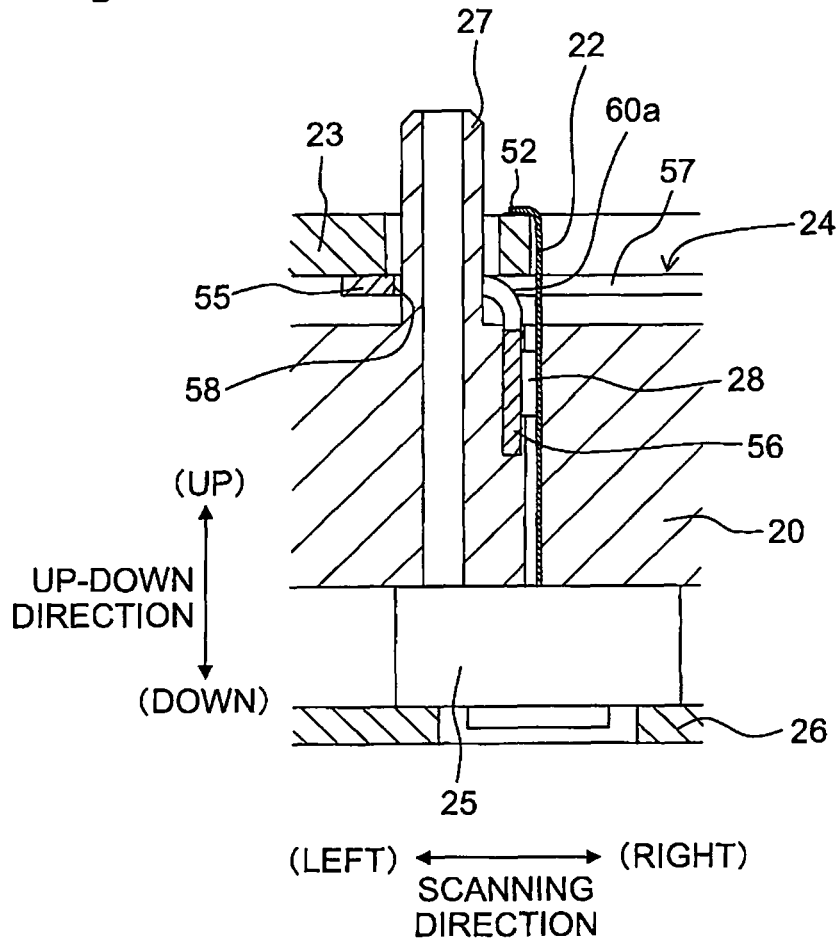
FIG. 14A is an enlarged view of a heat sink depicted in FIG. 13.
Figure 14B:
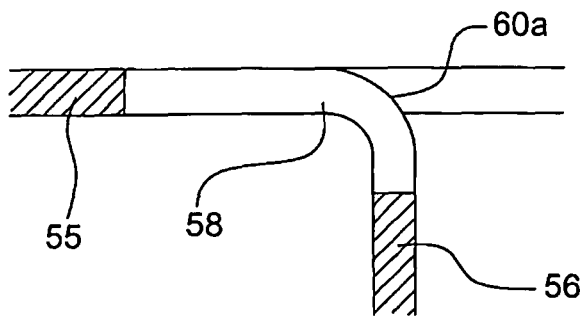
FIG. 14B is a partially enlarged cross-sectional view of the ink discharge apparatus according to still another modification.

Contrary to the aspect depicted in FIG. 13, it is allowable that the flow channel through holes 58 are formed in the heat sink 24 such that each of the flow channel through holes 58 is arranged from the body portion 55 and reaches one of the projections 56, via one of the bent portions 60a, as depicted in FIG. 14. In this configuration, the flow channel through holes 58 and the projections 56 are formed to be close to each other, the planar size of the heat sink 24 can be suppressed to be small. Note that in each of the bending portions 60a of the base material 60, the pulling force is generated at the outside of the bending and the compressive force is generated at the inside of the bending. Here, in a case that the edge of the flow channel through hole 58 is overlapped with or reaches the bending portion 60a and that the base material 60 is bent, the edge of the flow channel through hole 58 becomes distorted or misshapen due to the expansion at the outside of the bending portion 60a and the compression at the inside of the bending portion 60a, resulting in the change in the shape of the flow channel through hole 58. In this regard, each of the flow channel through holes 58 in the configuration depicted in FIG. 14 is shaped to extend from the body portion 55 and to reach the projection 56, the shape of the flow channel through hole 58 is hardly changed due to the bending.

From the viewpoint of soaking, by the heat sink 24, the heat generated in the four ICs 28 in a state that any rising of the temperature is suppressed, the heat resistance in the body portion 55 is preferably made to be small. With respect to this point, in a case that the width of the support portion, of the projection 56, supporting the IC 28 is great, there is generated a portion with a small width in an area surrounding the trace through hole 57, namely in an area spanning from the edge of the trace through hole 57 up to the outer edge of the body portion 55. Since the heat resistance becomes great in such a portion with the small width, the rising of temperature in the IC 28 as the heat source consequently becomes great.

On the other hand, in a case that the width of the base portion, of the projection 56, located closely to the side of the bending (located closely to the side of the body portion 55) is made to be small similar to the width of the support portion, the width (sectional area) of a heat transfer path via which the heat is transferred from the IC 28 to the body portion 55 becomes small, which consequently makes the rising of temperature to be great in the IC 28 as the heat source. Further, in a case that the entire width of the projection 56 is made to be small, the entire width of the trace through hole 57 is also made small, which in turn generates such a problem that the COF 22 is hard to pass through the trace through hole 57.

Figure 15A:
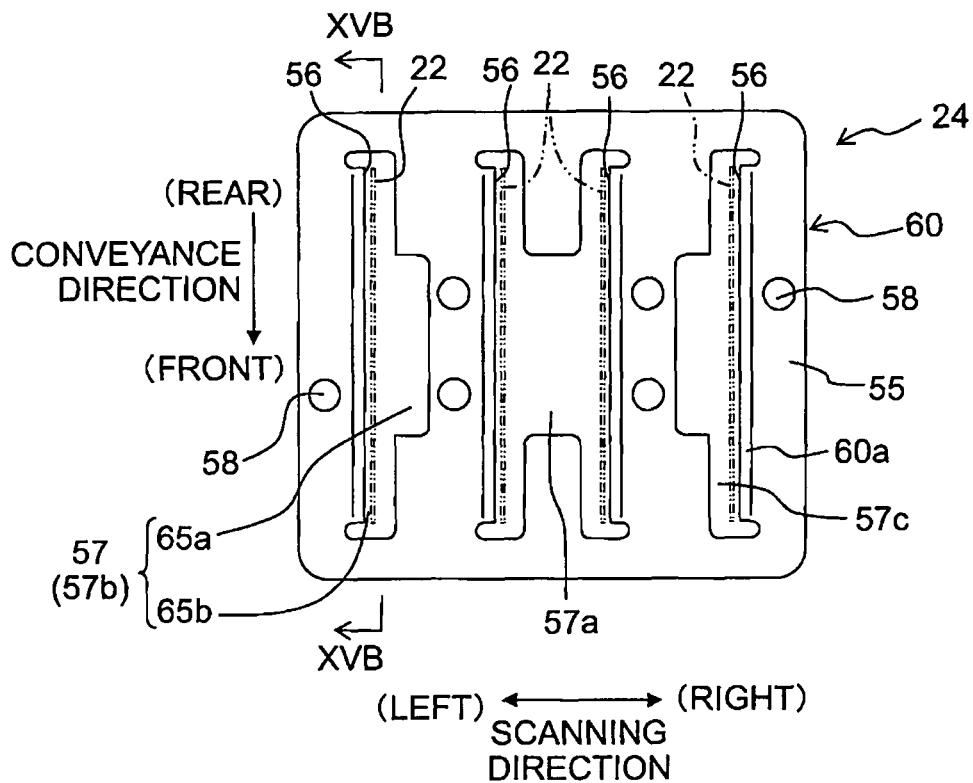
Figure 15B:
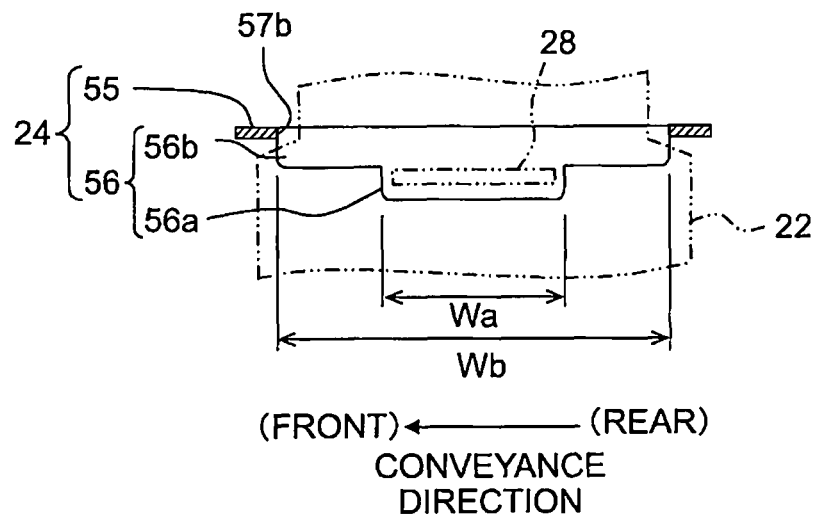

Accordingly, as depicted in FIG. 15, it is allowable that a width Wa of the support portion 56a, of the projection 56, which supports the IC 28 is smaller than a width Wb of the base portion 56b located on the side of the bending (on the side of the body portion 55). With this, the heat generated in the IC 28 can be transferred to the body portion 55 from the support portion 56a having a small width via the base portion 56b have a large width, in a state that the rising of the temperature is suppressed. Further, each of the trace through holes 57 formed in the body portion 55 is configured to have a first aperture 65a corresponding to the support portion 56a of the projection 56 and a second aperture 65b corresponding to the base portion 56b of the projection 56, wherein the COF 22 penetrates through the second aperture 65b, of the trace through hole 57, having a large width.

Note that it is not necessarily indispensable that all of the four projections 56 corresponding to the four head units 25, respectively, have the configuration depicted in FIG. 15. It is allowable that at least one of the four projections 56 has the configuration as depicted in FIG. 15.

In the above-described embodiment, the plate-shaped base material 60 is subjected to the bending processing by the press working to thereby form the body portion 55 and the four projections 56 extending downward from the body portion 55. The forming method of the heat sink 24 is not limited to the above-described press working. For example, it is allowable that members which are to become the projections are attached, by an adhesive, etc., to another plate-shaped member which is to become a body portion formed with trace through holes.

The ink-jet head 21 of the above-described embodiment has the four head units 25. However, the number of the head unit 25 is not limited to four.

In the above-described embodiment, the ink-jet head 21 has the plurality of head units 25. A configuration to which the present teaching is applicable, however, is not limited to the above-described embodiment. For example, as depicted in FIG. 16, a configuration is allowable wherein an ink jet head 71 of an ink discharge apparatus 70 has four nozzle plates 38 each of which is formed with two nozzles rows 31; a flow channel substrate 72 which is arranged to straddle over the four nozzle plates 38; and four piezoelectric element groups 73 arranged on the upper surface of the flow channel substrate 72, corresponding to the four nozzle plates 38, respectively. Namely, the configuration, wherein the flow channel substrate is provided commonly for the four piezoelectric element groups 73, is allowable.

As the driving element causing the ink to be discharged from the nozzle, it is allowable to adopt a variety of kinds of elements, other than the piezoelectric element 39 of the embodiment as described above. For example, the present teaching is applicable also to an apparatus having such a configuration including a heating element, as the driving element, which imparts thermal energy to an ink, wherein the ink is discharged from a nozzle by using the film boiling.

The embodiment and modifications thereof as described above are examples in each of which the present teaching is applied to an ink-jet printer which discharges or jets an ink onto a recording paper to thereby print an image, etc., on the recording paper. However, the present teaching is also applicable to liquid discharge apparatuses usable for various kinds of applications other than the printing of image, etc. For example, the present teaching is applicable also to a liquid discharge apparatus which forms a conductive pattern on a surface of a substrate by discharging a conductive liquid onto the substrate, etc.

What is claimed is:

1. A liquid discharge apparatus configured to discharge a liquid from a plurality of nozzles formed in a liquid discharge surface, comprising:
    a plurality of driving elements;
    a first member which includes a first trace electrically connected to ones of the plurality of driving elements, and a first IC electrically connected to the first trace;
    a second member which includes a second trace electrically connected to other ones of the plurality of driving elements, different from the ones of the plurality of driving elements, and a second IC electrically connected to the second trace, and which is arranged side by side with the first member in a first direction parallel to the liquid discharge surface;
    a metallic member which is arranged on one side with respect to the plurality of driving elements in a second direction orthogonal to the liquid discharge surface, the metallic member including:
        a body portion extending in the first direction while straddling over the plurality of driving elements, a first projection projected from the body portion toward the liquid discharge surface, and a second projection projected from the body portion toward the liquid discharge surface;
    flow channel forming members each formed with a liquid flow channel extending in the second direction; and
    a circuit board arranged to overlap with the body of the metallic member in a state that the circuit board is brought into contact with the body portion of the metallic member,
    wherein the first IC is supported by the first projection and the second IC is supported by the second projection;
    wherein the body portion, the first projection and the second projection of the metallic member are formed as an integrated member;
    wherein the body portion includes bent portions which are connected to the first and second projections, respectively and which are bent toward the liquid discharge surface, and apertures, at least a portion of each of the apertures being defined by one of the bent portions;
    wherein the first and second members pass through apertures, respectively, of the metallic member;
    wherein the circuit board includes a first connection terminal which is connectable to the first member and which is arranged in the vicinity of an overlapping portion, of the circuit board, overlapping with a bent portion included in the bent portions and located between the first projection and the body portion of the metallic member;
    wherein the circuit board includes a second connection terminal which is connectable to the second member and which is arranged in the vicinity of another overlapping portion, of the circuit board, overlapping with another bent portion included in the bent portions and located between the second projection and the body portion of the metallic member;
    wherein flow channel through holes, through which the flow channel forming members penetrate, are formed in the body portion of the metallic member; and
    wherein the flow channel through holes are formed, in the body portion, at areas each of which is not overlapping with the first connection terminal and the second connection terminal of the circuit board.

2. The liquid discharge apparatus according to claim 1, wherein the circuit board is arranged to overlap with the plurality of driving elements in the second direction orthogonal to the liquid discharge surface, and
    wherein the metallic member is arranged between the plurality of driving elements and the circuit board in the second direction.

3. The liquid discharge apparatus according to claim 1, wherein the first projections and the second projections are elongated in a third direction which is parallel to the liquid discharge surface and orthogonal to the first direction; and
    wherein the body portion includes a bent and folded portion which is formed by bending an edge portion of the body portion in the third direction, and by causing the bent edge portion to overlap with a continuing portion which is continued to the edge portion.

4. The liquid discharge apparatus according to claim 1, wherein the first and second projections are elongated in a third direction which is parallel to the liquid discharge surface and orthogonal to the first direction; and
 wherein the body portion includes a bent portion which is formed by bending an edge portion of the body portion in the third direction, and which is not overlapped with a continuing portion which is continued to the edge portion.

5. The liquid discharge apparatus according to claim 1, wherein each of the first and second projections has a support portion configured to support one of the first IC and the second IC, and a base portion located on a side closer to one of the bent portions corresponding thereto, than the support portion;
 wherein the support portion, of one projection among the first and second projections, includes a width smaller than a width of the base portion;
 wherein the metallic member is formed with a trace through hole through which one member included in the first and second members and corresponding to the one projection penetrates, the trace through hole having a first aperture corresponding to the support portion of the one projection, and a second aperture corresponding to the base portion of the one projection; and
 wherein the one member penetrates through the second aperture of the trace through hole.

6. The liquid discharge apparatus according to claim 1, further comprising:
 a first liquid discharge head which includes the ones of the plurality of driving elements; and
 a second liquid discharge head which is arranged side by side with the first liquid discharge head in the first direction and which includes the other ones of the plurality of driving elements,
 wherein the first member is connected to the first liquid discharge head, and the second member is connected to the second liquid discharge head.

7. The liquid discharge apparatus according to claim 6, wherein the ones of the plurality of driving elements of the first liquid discharge head constitute two first driving element rows which are arranged side by side with each other in the first direction; and
 wherein the other ones of the plurality of driving elements of the second liquid discharge head constitute two second driving element rows which are arranged side by side with each other in the first direction.

8. A liquid discharge apparatus configured to discharge a liquid from a plurality of nozzles formed in a liquid discharge surface, comprising:
 a plurality of driving elements;
 a first member which includes a first trace electrically connected to ones of the plurality of driving elements, and a first IC electrically connected to the first trace;
 a second member which includes a second trace electrically connected to other ones of the plurality of driving elements, different from the ones of the plurality of driving elements, and a second IC electrically connected to the second trace, and which is arranged side by side with the first member in a first direction parallel to the liquid discharge surface; and
 a metallic member which is arranged on one side with respect to the plurality of driving elements in a second direction orthogonal to the liquid discharge surface, the metallic member including:
  a body portion extending in the first direction while straddling over the plurality of driving elements, a first projection projected from the body portion toward the liquid discharge surface, and a second projection projected from the body portion toward the liquid discharge surface; and
 flow channel forming members each formed with a liquid flow channel extending in the second direction,
 wherein the first IC is supported by the first projection and the second IC is supported by the second projection;
 wherein the body portion, the first projection and the second projection of the metallic member are formed as an integrated member;
 wherein the body portion includes bent portions which are connected to the first and second projections, respectively and which are bent toward the liquid discharge surface, and apertures, at least a portion of each of the apertures being defined by one of the bent portions;
 wherein the first and second members pass through apertures, respectively, of the metallic member;
 wherein flow channel through holes, through which the flow channel forming members penetrate, are formed in the body portion of the metallic member; and
 wherein the flow channel through holes are formed, in the body portion, so that each of the flow channel through holes is arranged from the body portion and reaches the first projection or the second projection.

9. A liquid discharge apparatus configured to discharge a liquid from a plurality of nozzles formed in a liquid discharge surface, comprising:
 a plurality of driving elements;
 a first member which includes a first trace electrically connected to ones of the plurality of driving elements, and a first IC electrically connected to the first trace;
 a second member which includes a second trace electrically connected to other ones of the plurality of driving elements, different from the ones of the plurality of driving elements, and a second IC electrically connected to the second trace, and which is arranged side by side with the first member in a first direction parallel to the liquid discharge surface; and
 a metallic member which is arranged on one side with respect to the plurality of driving elements in a second direction orthogonal to the liquid discharge surface, the metallic member including: a body portion extending in the first direction while straddling over the plurality of driving elements, a first projection projected from the body portion toward the liquid discharge surface, and a second projection projected from the body portion toward the liquid discharge surface; and
 a circuit board,
 wherein the first IC is supported by the first projection and the second IC is supported by the second projection;
 wherein each of the first and second members includes a first portion arranged between the circuit board and one of the first IC and the second IC, and a second portion arranged between the plurality of driving elements and one of the first IC and the second IC;
 wherein the first portion, of one member, among the first and second members, includes a width smaller than a width of the second portion;
 wherein the metallic member is formed with a trace through hole through which the one member penetrates; and
 wherein the first portion of the one member penetrates through the trace through hole of the metallic member.

10. A liquid discharge apparatus configured to discharge a liquid from a plurality of nozzles formed in a liquid discharge surface, comprising:
a plurality of driving elements;
a first member which includes a first trace electrically connected to ones of the plurality of driving elements, and a first IC electrically connected to the first trace;
a second member which includes a second trace electrically connected to other ones of the plurality of driving elements, different from the ones of the plurality of driving elements, and a second IC electrically connected to the second trace, and which is arranged side by side with the first member in a first direction parallel to the liquid discharge surface;
a metallic member which is arranged on one side with respect to the plurality of driving elements in a second direction orthogonal to the liquid discharge surface, the metallic member including:
a body portion extending in the first direction while straddling over the plurality of driving elements, a first projection projected from the body portion toward the liquid discharge surface, and a second projection projected from the body portion toward the liquid discharge surface; and
a circuit board,
wherein the first IC is supported by the first projection and the second IC is supported by the second projection;
wherein a first connector is disposed in the circuit board at an end portion on one side in the first direction, and a second connector is disposed in the circuit board on another end portion on another side in the first direction;
wherein the circuit board is formed with a first through hole through which the first member passes, and a second through hole which is arranged on a side closer to the other side in the first direction than the first through hole, and through which the second member passes;
wherein a first connection terminal configured to be connectable to the first member is arranged in the circuit board on a side closer to the first connector than the first through hole, and a second connection terminal configured to be connectable to the second member is arranged in the circuit board on a side closer to the second connector than the second through hole;
wherein the body portion is formed with a first trace passing hole through which the first member passes, and a second trace passing hole which is arranged on the body portion on a side closer to the other side in the first direction than the first trace passing hole and through which the second member passes;
wherein the first projection extends in the second direction from an edge portion, of the first trace passing hole, on the one side in the first direction; and
wherein the second projection extends in the second direction from an edge portion, of the second trace passing hole, on the other side in the first direction.

11. A liquid discharge apparatus comprising:
a plurality of nozzles formed in a liquid discharge surface;
driving elements each of which corresponding to one of the plurality of nozzles respectively;
a first member including a first trace electrically connected to one of the driving elements and a first IC electrically connected to the first trace;
a metallic member supporting the first IC, the metallic member being arranged on one side with respect to the driving elements in an orthogonal direction, which is orthogonal to the liquid discharge surface; and
a liquid flow channel extending in the orthogonal direction,
wherein the metallic member extends along a parallel direction while straddling over the driving elements, the parallel direction being parallel to the liquid discharge surface,
wherein the metallic member has a through hole, and
wherein the liquid flow channel passes through the through hole of the metallic member.

12. The liquid discharge apparatus according to claim 11, wherein the first member passes through the through hole of the metallic member.

13. The liquid discharge apparatus according to claim 12, wherein the metallic member has another through hole, the first member passing through the another through hole.

14. The liquid discharge apparatus according to claim 11, further comprising a second member including a second trace electrically connected to another one of the driving elements and a second IC electrically connected to the second trace.

15. The liquid discharge apparatus according to claim 14, wherein the first and second members are arranged side by side each other in the parallel direction.

16. The liquid discharge apparatus according to claim 15, wherein the second member is supported by the metallic member.

17. A liquid discharge apparatus comprising:
a plurality of nozzles formed in a liquid discharge surface;
driving elements each of which corresponding to one of the plurality of nozzles respectively;
a first member including a first trace electrically connected to one of the driving elements and a first IC electrically connected to the first trace;
a heat sink supporting the first IC, the heat sink being arranged on one side with respect to the driving elements in an orthogonal direction, which is orthogonal to the liquid discharge surface; and
a liquid flow channel extending in the orthogonal direction,
wherein the heat sink extends along a parallel direction while straddling over the driving elements, the parallel direction being parallel to the liquid discharge surface,
wherein the heat sink has a through hole, and
wherein the liquid flow channel passes through the through hole of the heat sink.

* * * * *